United States Patent
Tsuda et al.

(10) Patent No.: US 11,381,261 B2
(45) Date of Patent: Jul. 5, 2022

(54) RADIO-FREQUENCY MODULE AND COMMUNICATION APPARATUS

(71) Applicant: Murata Manufacturing Co., Ltd., Kyoto (JP)

(72) Inventors: Motoji Tsuda, Kyoto (JP); Yusuke Naniwa, Kyoto (JP); Morio Takeuchi, Kyoto (JP); Atsushi Horita, Kyoto (JP); Jin Yokoyama, Kyoto (JP); Sho Matsumoto, Kyoto (JP); Syunsuke Kido, Kyoto (JP); Yukiya Yamaguchi, Kyoto (JP); Hiroyuki Kani, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/368,958

(22) Filed: Jul. 7, 2021

(65) Prior Publication Data

US 2021/0336639 A1 Oct. 28, 2021

Related U.S. Application Data

(63) Continuation of application No. PCT/JP2019/050854, filed on Dec. 25, 2019.

(30) Foreign Application Priority Data

Feb. 7, 2019 (JP) .............................. JP2019-021001

(51) Int. Cl.
*H04M 1/00* (2006.01)
*H04B 1/00* (2006.01)
*H04B 1/16* (2006.01)

(52) U.S. Cl.
CPC ........... *H04B 1/006* (2013.01); *H04B 1/1615* (2013.01)

(58) Field of Classification Search
CPC ........ H04B 1/006; H04B 1/0057; H04B 1/18; H04B 1/16; H04B 1/48; H04B 1/40; H04B 1/44
See application file for complete search history.

(56) References Cited

U.S. PATENT DOCUMENTS

2005/0048927 A1 3/2005 Kemmochi et al.
2009/0262672 A1* 10/2009 Sin ..................... H04B 1/0064
370/297

(Continued)

FOREIGN PATENT DOCUMENTS

| JP | 2004-007408 A | 1/2004 |
| WO | 2015/041125 A1 | 3/2015 |

OTHER PUBLICATIONS

Mediatek, 5G NR uplink enhancements white paper, 2018, https://newsletter.mediatek.com/hubfs/mwc/download/ul-enhancements.pdf.

(Continued)

*Primary Examiner* — Inhan T Le
(74) *Attorney, Agent, or Firm* — Pearne & Gordon LLP

(57) ABSTRACT

A radio-frequency module includes a transmission path which has one end connected to a transmission terminal and on which a transmission signal in Band A is transmitted; a reception path (62) which has one end connected to a reception terminal (120B) and on which a reception signal in Band B is transmitted; a reception path (63) which has one end connected to a reception terminal (120C) and on which a reception signal in Band C is transmitted; a switch (11) having a common terminal (11a) and selection terminals (11b and 11c); and a switch (12) having a common terminal (12a) and selection terminals (12b and 12c).

16 Claims, 8 Drawing Sheets

(56) References Cited

U.S. PATENT DOCUMENTS

2016/0197643 A1    7/2016  Uejima
2020/0187229 A1*   6/2020  Sano .................. H04W 52/18
2021/0218158 A1*   7/2021  Kim ................... H01Q 21/28

OTHER PUBLICATIONS

Ericsson, 3GPP spectrum bands, Jul. 31, 2019, https://www.ericsson.com/4a341b/assets/local/policy-makers-and-regulators/19C731-3gpp-spectrum-bands.pdf.
International Search Report issued in Application No. PCT/JP2019/050854, dated Feb. 4, 2020.
Written Opinion issued in Application No. PCT/JP2019/050854, dated Feb. 4, 2020.

* cited by examiner

RADIO-FREQUENCY MODULE AND COMMUNICATION APPARATUS

CROSS REFERENCE TO RELATED APPLICATION

This is a continuation of International Application No. PCT/JP2019/050854 filed on Dec. 25, 2019 which claims priority from Japanese Patent Application No. 2019-021001 filed on Feb. 7, 2019. The contents of these applications are incorporated herein by reference in their entireties.

BACKGROUND

Technical Field

The present disclosure relates to a radio-frequency module that processes radio-frequency signals and a communication apparatus.

Mobile communication terminals in recent years are required to support multiple frequency bands (multiband communication). In order to support the multiband communication, radio-frequency modules connected to antennas are required to suppress mutual interference to transmit radio-frequency signals in the multiple frequency bands with high quality.

Patent Document 1 discloses a radio-frequency module having a configuration in which multiple duplexers (transmission filters and reception filters) are connected to a switch. In this configuration, a phase circuit is arranged between the duplexers and selection terminals of the switch. With this configuration, it is possible to suppress leakage of harmonic waves of a transmission signal through the switch from one duplexer to another duplexer, that is, from one signal path to another signal path.

Patent Document 1: International Publication No. 2015/041125

BRIEF SUMMARY

However, in the radio-frequency module disclosed in Patent Document 1, when the number of the signal paths connected to the switch is increased for the multiband communication, the number of the selection terminals of the switch is increased. When the number of the selection terminals of the switch is increased, the off-capacitance of the switch is increased to increase the transmission loss of the switch due to the off capacitance. In particular, when a high-power transmission path is connected to the switch, the transmission loss of the switch is further increased also due to a reduction in the voltage resistance of the selection terminals. As a result, the transmission loss of the signal paths connected to the switch is increased and, in addition, a problem occurs in that the isolation between the transmission path and a reception path is degraded.

The present disclosure provides a radio-frequency module and a communication apparatus having suppressed degradation in the isolation between transmission and reception while reducing the transmission loss of the radio-frequency signals.

A radio-frequency module according to an aspect of the present disclosure includes a transmission-reception terminal, a first reception terminal, a second reception terminal, and a transmission terminal; a first transmission path having one end connected to the transmission terminal; a first reception path having one end connected to the first reception terminal; a second reception path having one end connected to the second reception terminal; a first switch that has a first common terminal, a first selection terminal, and a second selection terminal and that switches between connection between the first common terminal and the first selection terminal and connection between the first common terminal and the second selection terminal; and a second switch that has a second common terminal, a third selection terminal, and a fourth selection terminal and that switches between connection between the second common terminal and the third selection terminal and connection between the second common terminal and the fourth selection terminal. The first common terminal is connected to the transmission-reception terminal. The first selection terminal is connected to the second common terminal. The second selection terminal is connected to the other end of the first transmission path. The third selection terminal is connected to the other end of the first reception path. The fourth selection terminal is connected to the other end of the second reception path. The second switch is connected only to the reception paths, among the transmission path on which a transmission signal is transmitted and the reception paths on which reception signals are transmitted.

According to the present disclosure, it is possible to provide a radio-frequency module and a communication apparatus having suppressed degradation in the isolation between transmission and reception while reducing the transmission loss of the radio-frequency signals.

DETAILED DESCRIPTION

Figure 1:
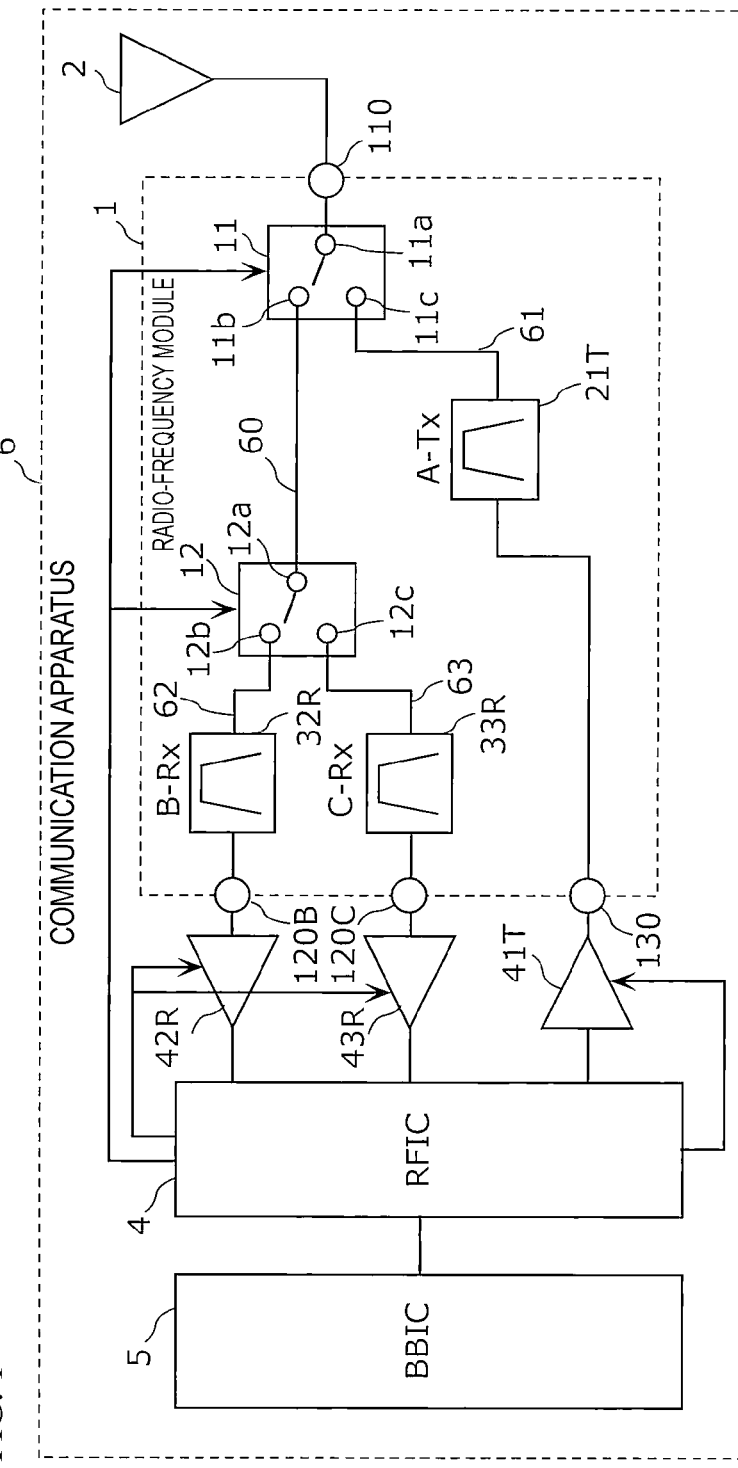
FIG. 1 is a circuit configuration diagram of a radio-frequency module and a communication apparatus according to a first embodiment.

Embodiments of the present disclosure will herein be described in detail with reference to the drawings. All the embodiments described below indicate comprehensive or specific examples. Numerical values, shapes, materials, components, the arrangement of the components, the connection mode of the components, and so on, which are indicated in the embodiments described below, are only examples and are not intended to limit the present disclosure. Among the components in the embodiments described below, the components that are not described in the independent claims are described as optional components. In addition, the sizes or the ratios of the sizes of the components illustrated in the drawings are not necessarily strictly indicated.

First Embodiment 1. 1 Configuration of Radio-Frequency Module 1 and Communication Apparatus 6

FIG. 1 is a circuit configuration diagram of a radio-frequency module 1 and a communication apparatus 6 according to a first embodiment. As illustrated in FIG. 1, the communication apparatus 6 includes the radio-frequency module 1, a transmission amplifier 41T, reception amplifiers 42R and 43R, a radio-frequency signal processing circuit (radio frequency integrated circuit (RFIC)) 4, a baseband signal processing circuit (baseband integrated circuit (BBIC)) 5, and an antenna 2.

The RFIC 4 is an RF signal processing circuit that processes radio-frequency signals transmitted and received through the antenna 2. Specifically, the RFIC 4 performs signal processing, such as down conversion, to a reception signal input through a reception path of the radio-frequency module 1 and supplies the reception signal generated through the signal processing to the BBIC 5. In addition, the RFIC 4 performs signal processing, such as up conversion, to a transmission signal supplied from the BBIC 5 and supplies the transmission signal generated through the signal processing to a transmission path of the radio-frequency module 1.

The BBIC 5 is a circuit that performs signal processing using an intermediate frequency band lower than the radio-frequency signals propagated through the radio-frequency module 1. The signal processed in the BBIC 5 is used as, for example, an image signal for image display or an audio signal for talking with a speaker.

The RFIC 4 also functions as a control unit that switches connection of switches 11 and 12 in the radio-frequency module 1 based on a communication band (frequency band) that is used and that controls gains of the transmission amplifier 41T and the reception amplifiers 42R and 43R. Specifically, the RFIC 4 switches connection of the switches 11 and 12 in the radio-frequency module 1 and adjusts the gains of the transmission amplifier 41T and the reception amplifiers 42R and 43R using control signals. The control unit may be provided outside the RFIC 4. For example, the control unit may be provided in the radio-frequency module 1 or the BBIC 5.

The transmission amplifier 41T preferentially amplifies a radio-frequency signal in Band A (a first communication band) and supplies the transmission signal resulting from the amplification to the radio-frequency module 1 via a transmission terminal 130.

The reception amplifier 42R preferentially amplifies the reception signal in Band B (a second communication band), among the reception signals supplied from the radio-frequency module 1 through a reception terminal 120B, and supplies the reception signal resulting from the amplification to the RFIC 4.

The reception amplifier 43R preferentially amplifies the reception signal in Band C (a third communication band), among the reception signals supplied from the radio-frequency module 1 through a reception terminal 120C, and supplies the reception signal resulting from the amplification to the RFIC 4.

The transmission amplifier 41T and the reception amplifiers 42R and 43R are each composed of, for example, a complementary metal oxide semiconductor (CMOS), a field effect transistor (FET) made of GaAs, or a hetero junction bipolar transistor (HBT).

The antenna 2 is connected to a transmission-reception terminal 110 of the radio-frequency module 1. The antenna 2 radiates the transmission signal supplied from the radio-frequency module 1 and receives the radio-frequency signal from the outside to supply the received radio-frequency signal to the radio-frequency module 1. In the communication apparatus 6 according to the present embodiment, the antenna 2 and the BBIC 5 are optional components.

The transmission amplifier 41T and the reception amplifiers 42R and 43R may be provided in the radio-frequency module 1.

A detailed configuration of the radio-frequency module 1 will now be described.

As illustrated in FIG. 1, the radio-frequency module 1 includes the transmission-reception terminal 110, the reception terminal 120B (a first reception terminal), the reception terminal 120C (a second reception terminal), the transmission terminal 130, a transmission path 61, reception paths 62 and 63, the switches 11 and 12, a transmission filter 21T, and reception filters 32R and 33R.

The switch 11 is a first switch that has a common terminal 11a (a first common terminal), a selection terminal 11b (a first selection terminal), and a selection terminal 11c (a second selection terminal) and that switches between connection between the common terminal 11a and the selection terminal 11b and connection between the common terminal 11a and the selection terminal 11c.

The switch 12 is a second switch that has a common terminal 12a (a second common terminal), a selection terminal 12b (a third selection terminal), and a selection terminal 12c (a fourth selection terminal) and that switches between connection between the common terminal 12a and the selection terminal 12b and connection between the common terminal 12a and the selection terminal 12c.

The transmission path 61 is a first transmission path that has one end connected to the transmission terminal 130 and the other end connected to the selection terminal 11c and that transmits the transmission signal in Band A, which is input through the transmission terminal 130. The transmission path 61 supports High Power User Equipment (HPUE).

The reception path 62 is a first reception path that has one end connected to the reception terminal 120B and the other end connected to the selection terminal 12b and that transmits the reception signal in Band B, which is input through the transmission-reception terminal 110.

The reception path 63 is a second reception path that has one end connected to the reception terminal 120C and the other end connected to the selection terminal 12c and that transmits the reception signal in Band C, which is input through the transmission-reception terminal 110.

A reception path 60 connecting the selection terminal 11b to the common terminal 12a composes the first reception path transmitting the reception signal in Band B, with the reception path 62, and composes the second reception path transmitting the reception signal in Band C, with the reception path 63.

In this description, the transmission path means a signal path on which the transmission signal in one or more communication bands is preferentially transmitted at an arbitrary time. The reception path means a signal path on which the reception signal in one or more communication bands is preferentially transmitted at an arbitrary time. Each of the transmission path and the reception path is composed of, for example, a conductor line. For example, a filter, an impedance matching element, such as an inductor or a capacitor, a switch, and/or a phase shifter are arranged on one signal path.

The transmission filter 21T uses a Band A transmission band as a passband. The input terminal of the transmission filter 21T is connected to the transmission terminal 130 via the transmission path 61 and the output terminal of the transmission filter 21T is connected to the selection terminal 11c via the transmission path 61.

The reception filter 32R uses a Band B reception band as the passband. The output terminal of the reception filter 32R is connected to the reception terminal 120B via the reception path 62 and the input terminal of the reception filter 32R is connected to the selection terminal 12b via the reception path 62.

The reception filter 33R uses a Band C reception band as the passband. The output terminal of the reception filter 33R is connected to the reception terminal 120C via the reception path 63 and the input terminal of the reception filter 33R is connected to the selection terminal 12c via the reception path 63.

Although a surface acoustic wave filter, an acoustic wave filter using bulk acoustic waves (BAWs), an LC resonant filter, a dielectric filter, and the like are exemplified as the transmission filter 21T and the reception filters 32R and 33R, the material and the structure of these filters are not limited.

The common terminal 11a is connected to the transmission-reception terminal 110. The selection terminal 11b is connected to the common terminal 12a. The selection terminal 11c is connected to the other end of the transmission path 61. The selection terminal 12b is connected to the other end of the reception path 62. The selection terminal 12c is connected to the other end of the reception path 63.

The switch 12 is connected only to the reception paths, among the transmission path on which the transmission signal is transmitted and the reception paths on which the reception signals are transmitted. In other words, the switch 12 is not connected to the transmission path on which the transmission signal is transmitted and is connected to the reception paths on which the reception signals are transmitted.

In a typical radio-frequency module in related art, one or more transmission paths and one or more reception paths are connected to the switch connected to the antenna in order to support the multiband communication. In this case, when the number of the bands is increased with the accelerated multiband communication, the number of the selection terminals of the switch, to which the signal paths are connected, is increased. When the number of the selection terminals of the switch is increased, the off capacitance of the switch is increased and the transmission loss of the radio-frequency signal passing through the switch is increased due to the off capacitance. In particular, when the transmission path on which the high-power transmission signal conforming to the HPUE standard is transmitted is connected to the switch, the transmission loss of the radio-frequency signal passing through the switch is further increased also due to a reduction in the voltage resistance of the selection terminals. As a result, the transmission loss of the signal paths connected to the switch is increased and, in addition, a problem occurs in that the isolation between the transmission path and the reception path is degraded.

In contrast, according to the radio-frequency module 1 according to the first embodiment, the switch 12 to which the reception paths 62 and 63 are connected is different from the switch 11 to which the transmission path 61 is connected. Specifically, the switch 12 is not connected to the transmission path and is connected only to the reception paths. Accordingly, since the switch 11 is not connected to the reception paths 62 and 63, the number of the selection terminals of the switch 11 is capable of being decreased. In addition, since the switch 12 is not connected to the transmission path 61, the number of the selection terminals of the switch 12 is capable of being decreased. Consequently, since the off capacitance of the switches 11 and 12 is capable of being reduced, the transmission loss of the transmission signal passing through the switch 11 is reduced and the transmission loss of the reception signals passing through the switch 12 is reduced.

In addition, since no high-power transmission path is connected to the switch 12, it is optional to increase the voltage resistance of the selection terminals of the switch 12. Accordingly, since it is optional to ensure the long distance between the terminals of the switch 12, the switch 12 is reduced in size.

Furthermore, since the transmission path 61 is connected to the reception paths 62 and 63 via the two-stage switches 11 and 12 that are cascade-connected to each other, the transmission signal and harmonic waves of the transmission signal transmitted on the transmission path 61 are suppressed from flowing into the reception paths 62 and 63. Accordingly, it is possible to suppress the degradation of the isolation between the transmission path and the reception paths.

In the radio-frequency module 1 according to the present embodiment, the transmission filter 21T may not be arranged on the transmission path 61. The reception filter 32R may not be arranged on the reception path 62. The reception filter 33R may not be arranged on the reception path 63.

Three or more reception paths may be connected to the switch 12.

The transmission amplifier 41T and the reception amplifiers 42R and 43R may be each composed of, for example, a semiconductor integrated circuit (IC). This semiconductor IC may include the switches 11 and 12 and a digital control circuit, in addition to the transmission amplifier 41T and the reception amplifiers 42R and 43R. The semiconductor IC is composed of, for example, a CMOS. In this case, it is possible to inexpensively manufacture the semiconductor IC. The semiconductor IC may be made of GaAs. In this case, it is possible to output the radio-frequency signal having high-quality amplification performance and noise performance.

Band A (the first communication band) may be the same as Band B (the second communication band). Band A (the first communication band) may be the same as Band C (the third communication band).

1. 2 Configuration of Radio-Frequency Module 1A According to First Modification

Figure 2:
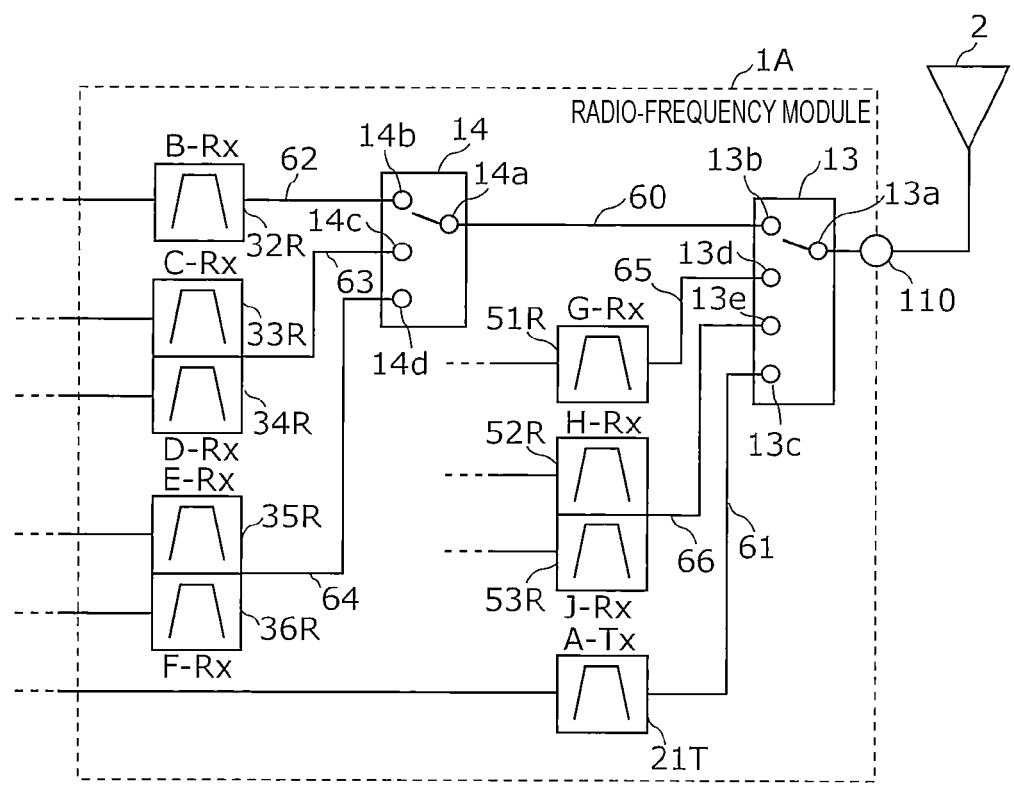
FIG. 2 is a circuit configuration diagram of a radio-frequency module according to a first modification of the first embodiment.

FIG. 2 is a circuit configuration diagram of a radio-frequency module 1A according to a first modification of the first embodiment. As illustrated in FIG. 2, the radio-frequency module 1A includes the transmission-reception terminal 110, the transmission path 61, the reception paths 62 and 63 and reception paths 64, 65, and 66, switches 13 and 14, the transmission filter 21T, and the reception filters 32R and 33R and reception filters 34R, 35R, 36R, 51R, 52R, and 53R. The radio-frequency module 1A according to the present modification differs from the radio-frequency module 1 according to the first embodiment in that the reception paths are connected also to the first switch and in the number of the reception paths connected to the second switch. A description of the same points of the radio-frequency module 1A according to the present modification as in the radio-frequency module 1 according to the first embodiment is omitted herein and points of the radio-frequency module 1A according to the present modification different from the radio-frequency module 1 according to the first embodiment are mainly described.

The switch 13 is the first switch having a common terminal 13a (the first common terminal), a selection terminal 13b (the first selection terminal), a selection terminal 13c (the second selection terminal), a selection terminal 13d (a fifth selection terminal), and a selection terminal 13e. In other words, the switch 13 further has the selection terminal 13d (the fifth selection terminal) and the selection terminal 13e, compared with the switch 11 in the radio-frequency module 1. The switch 13 switches connection between the common terminal 13a and the selection terminals 13b to 13e with the above configuration. More specifically, the switch 13 exclusively performs connection between the common terminal 13a and the selection terminal 13b and connection between the common terminal 13a and the selection terminal 13c. The switch 13 is capable of concurrently performing connection between the common terminal 13a and the selection terminal 13c and connection between the common terminal 13a and the selection terminal 13d. The switch 13 is capable of concurrently performing connection between the common terminal 13a and the selection terminal 13c and connection between the common terminal 13a and the selection terminal 13e.

In the switches in this description, "exclusively performing connection between a terminal A and a terminal B and connection between a terminal C and a terminal D" means that (1) the terminal C and the terminal D are in a non-connection state in a state in which the terminal A is connected to the terminal B and (2) the terminal A and the terminal B are in the non-connection state in a state in which the terminal C is connected to the terminal D.

The switch 14 is the second switch having a common terminal 14a (the second common terminal), a selection terminal 14b (the third selection terminal), a selection terminal 14c (the fourth selection terminal), and a selection terminal 14d. The switch 14 further has the selection terminal 14d, compared with the switch 12 in the radio-frequency module 1. The switch 14 switches connection between the common terminal 14a and the selection terminals 14b to 14d with the above configuration.

The transmission path 61 is the first transmission path that has one end connected to the transmission terminal 130 (not illustrated in FIG. 2) and the other end connected to the selection terminal 13c and that transmits the transmission signal in Band A (the first communication band), which is input through the transmission terminal 130.

The reception path 62 is the first reception path that has one end connected to the reception terminal 120B (not illustrated in FIG. 2) and the other end connected to the selection terminal 14b and that transmits the reception signal in Band B (the second communication band), which is input through the transmission-reception terminal 110.

The reception path 63 is the second reception path that has one end connected to the reception terminal 120C (not illustrated in FIG. 2) and the other end connected to the selection terminal 14c and that transmits the reception signals in Band C (the third communication band) and Band D, which are input through the transmission-reception terminal 110.

The reception path 64 is a reception path that has one end connected to a reception terminal (not illustrated in FIG. 2) and the other end connected to the selection terminal 14d and that transmits the reception signals in Band E and Band F, which are input through the transmission-reception terminal 110.

The reception path 60 connecting the selection terminal 13b to the common terminal 14a composes the first reception path transmitting the reception signal in Band B, with the reception path 62. The reception path 60 composes the second reception path transmitting the reception signals in Band C and Band D, with the reception path 63. The reception path 60 composes the reception path transmitting the reception signals in Band E and Band F, with the reception path 64.

The reception path 65 is a third reception path that has one end connected to a reception terminal (not illustrated in FIG. 2) and the other end connected to the selection terminal 13d (the fifth selection terminal) and that transmits the reception signal in Band G (a fourth communication band), which is input through the transmission-reception terminal 110.

The reception path 66 is a reception path that has one end connected to a reception terminal (not illustrated in FIG. 2) and the other end connected to the selection terminal 13e and that transmits the reception signals in Band H and Band J, which are input through the transmission-reception terminal 110.

The transmission filter 21T uses the Band A transmission band as the passband. The input terminal of the transmission filter 21T is connected to the transmission terminal 130 (not illustrated in FIG. 2) via the transmission path 61 and the output terminal of the transmission filter 21T is connected to the selection terminal 13c via the transmission path 61.

The reception filter 32R uses the Band B reception band as the passband. The output terminal of the reception filter 32R is connected to the reception terminal 120B (not illustrated in FIG. 2) via the reception path 62 and the input terminal of the reception filter 32R is connected to the selection terminal 14b via the reception path 62.

The reception filter 33R uses the Band C reception band as the passband. The output terminal of the reception filter 33R is connected to the reception terminal 120C (not illustrated in FIG. 2) via the reception path 63 and the input terminal of the reception filter 33R is connected to the selection terminal 14c via the reception path 63.

The reception filter 34R uses a Band D reception band as the passband. The output terminal of the reception filter 34R is connected to a reception terminal (not illustrated in FIG. 2) via the reception path 63 and the input terminal of the reception filter 34R is connected to the selection terminal 14c via the reception path 63.

The reception filter 35R uses a Band E reception band as the passband. The output terminal of the reception filter 35R is connected to a reception terminal (not illustrated in FIG. 2) via the reception path 64 and the input terminal of the reception filter 35R is connected to the selection terminal 14d via the reception path 64.

The reception filter 36R uses a Band F reception band as the passband. The output terminal of the reception filter 36R is connected to a reception terminal (not illustrated in FIG.

2) via the reception path 64 and the input terminal of the reception filter 36R is connected to the selection terminal 14*d* via the reception path 64.

The reception filter 51R uses a Band G reception band as the passband. The output terminal of the reception filter 51R is connected to a reception terminal (not illustrated in FIG. 2) via the reception path 65 and the input terminal of the reception filter 51R is connected to the selection terminal 13*d* via the reception path 65.

The reception filter 52R uses a Band H reception band as the passband. The output terminal of the reception filter 52R is connected to a reception terminal (not illustrated in FIG. 2) via the reception path 66 and the input terminal of the reception filter 52R is connected to the selection terminal 13*e* via the reception path 66.

The reception filter 53R uses a Band J reception band as the passband. The output terminal of the reception filter 53R is connected to a reception terminal (not illustrated in FIG. 2) via the reception path 66 and the input terminal of the reception filter 53R is connected to the selection terminal 13*e* via the reception path 66.

Although a surface acoustic wave filter, an acoustic wave filter using the BAWs, an LC resonant filter, a dielectric filter, and the like are exemplified as the transmission filter 21T and the reception filters 32R to 36R and 51R to 53R, the material and the structure of these filters are not limited.

The common terminal 13*a* is connected to the transmission-reception terminal 110. The selection terminal 13*b* is connected to the common terminal 14*a*. The selection terminal 13*c* is connected to the other end of the transmission path 61. The selection terminal 14*b* is connected to the other end of the reception path 62. The selection terminal 14*c* is connected to the other end of the reception path 63.

The switch 14 is connected only to the reception paths, among the transmission path on which the transmission signal is transmitted and the reception paths on which the reception signals are transmitted.

In the radio-frequency module 1A according to the present modification, with the above configuration, the transmission of the transmission signal in Band A on the transmission path 61 is performed concurrently with the transmission of the reception signal in Band G on the reception path 65. The transmission of the transmission signal in Band A on the transmission path 61 is performed concurrently with the transmission of the reception signal in Band H on the reception path 66. The transmission of the transmission signal in Band A on the transmission path 61 is performed concurrently with the transmission of the reception signal in Band J on the reception path 66.

The transmission of the reception signal in Band B on the reception path 62 and the transmission of the transmission signal in Band A on the transmission path 61 are exclusively performed. The transmission of the reception signal in Band C on the reception path 63 and the transmission of the transmission signal in Band A on the transmission path 61 are exclusively performed. The transmission of the reception signal in Band D on the reception path 63 and the transmission of the transmission signal in Band A on the transmission path 61 are exclusively performed. The transmission of the reception signal in Band E on the reception path 64 and the transmission of the transmission signal in Band A on the transmission path 61 are exclusively performed. The transmission of the reception signal in Band F on the reception path 64 and the transmission of the transmission signal in Band A on the transmission path 61 are exclusively performed.

Figure 3A:
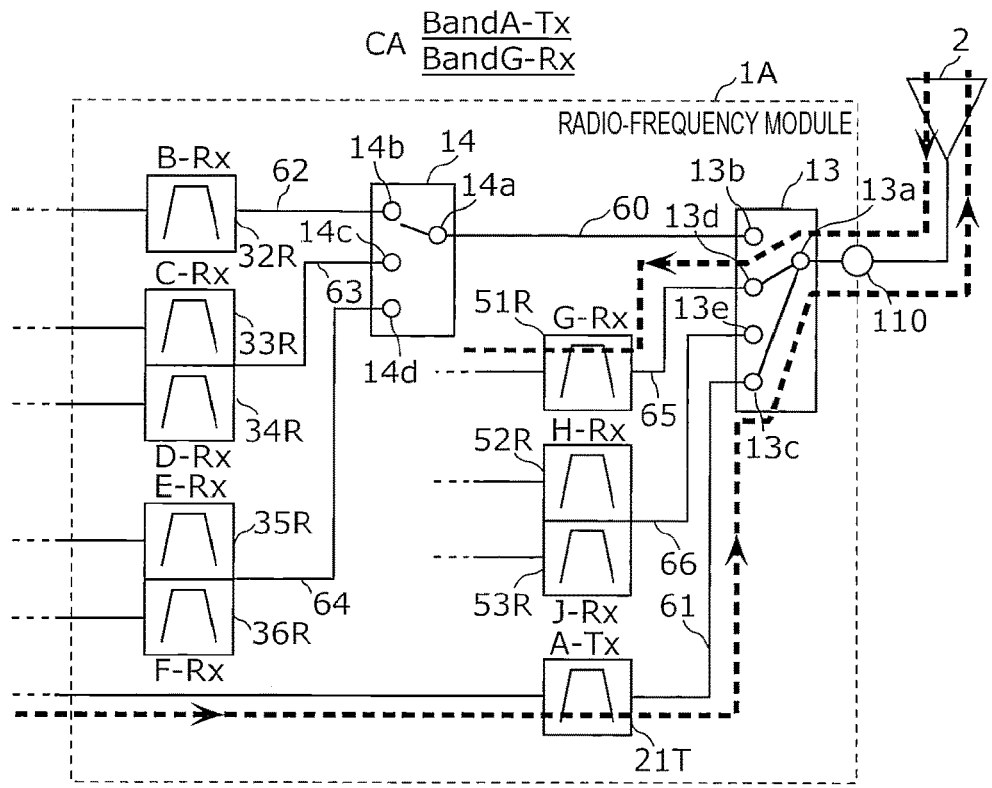
FIG. 3A is a diagram illustrating the circuit state when a transmission signal in Band A and a reception signal in Band G are concurrently transmitted in the radio-frequency module according to the first modification of the first embodiment.

FIG. 3A is a diagram illustrating the circuit state when the transmission signal in Band A and the reception signal in Band G are concurrently transmitted in the radio-frequency module 1A according to the first modification of the first embodiment. As illustrated in FIG. 3A, when the transmission signal in Band A and the reception signal in Band G are concurrently transmitted, the common terminal 13*a* and the selection terminal 13*c* are in a connection state and the common terminal 13*a* and the selection terminal 13*d* are in the connection state in the switch 13.

In this state, the transmission signal in Band A is supplied to the antenna 2 via the transmission terminal 130 (not illustrated in FIG. 3A), the transmission path 61 and the transmission filter 21T, the selection terminal 13*c*, the common terminal 13*a*, and the transmission-reception terminal 110. Concurrently, the reception signal in Band G is supplied from the reception terminal (not illustrated in FIG. 3A) to the reception amplifier (not illustrated in FIG. 3A) via the antenna 2, the transmission-reception terminal 110, the common terminal 13*a*, the selection terminal 13*d*, the reception path 65, and the reception filter 51R.

Figure 3B:
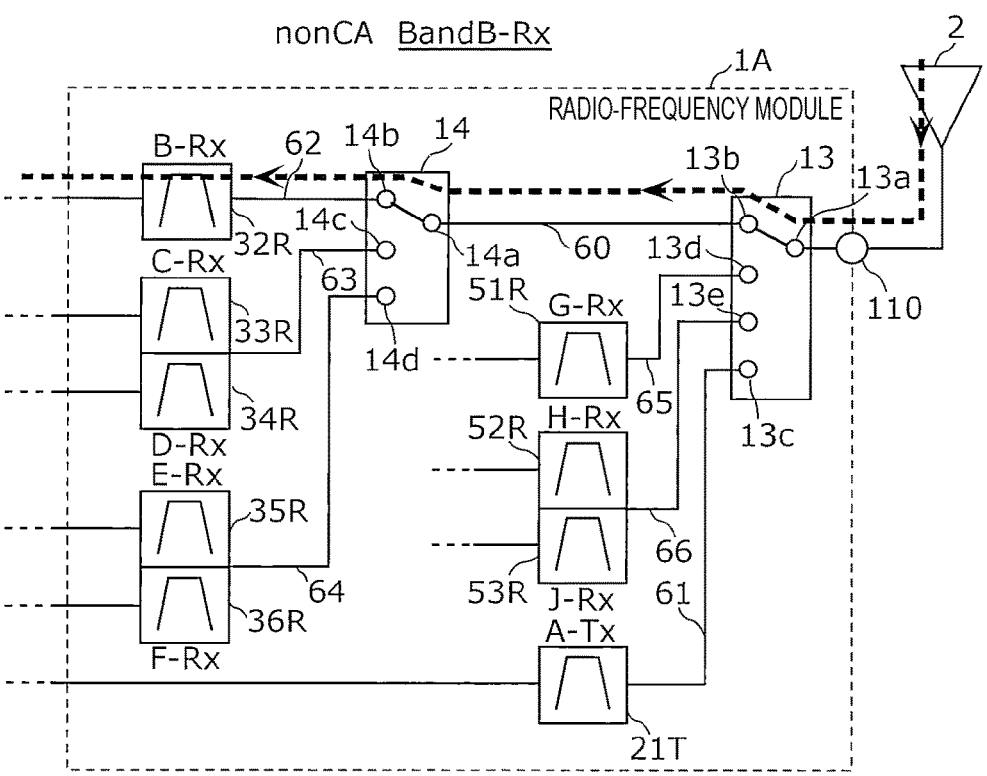
FIG. 3B is a diagram illustrating the circuit state when a reception signal in Band B is transmitted in the radio-frequency module according to the first modification of the first embodiment.

FIG. 3B is a diagram illustrating the circuit state when the reception signal in Band B is transmitted in the radio-frequency module 1A according to the first modification of the first embodiment. As illustrated in FIG. 3B, when the reception signal in Band B is transmitted, the common terminal 13*a* and the selection terminal 13*b* are in the connection state and the common terminal 13*a* and the selection terminal 13*c* are in the non-connection state in the switch 13. The common terminal 14*a* and the selection terminal 14*b* are in the connection state in the switch 14.

In this state, the reception signal in Band B is supplied to the reception amplifier 42R (not illustrated in FIG. 3B) via the antenna 2, the transmission-reception terminal 110, the common terminal 13*a*, the selection terminal 13*b*, the reception path 60, the common terminal 14*a*, the selection terminal 14*b*, the reception path 62 and the reception filter 32R, and the reception terminal 120B (not illustrated in FIG. 3B).

According to the radio-frequency module 1A according to the present modification, the switch 14 to which the reception paths 62, 63, and 64 are connected is different from the switch 13 to which the transmission path 61 is connected. Specifically, the switch 14 is not connected to the transmission path and is connected only to the reception paths. Accordingly, since the switch 13 is not connected to the reception paths 62 to 64, the number of the selection terminals of the switch 13 is capable of being decreased. In addition, since the switch 14 is not connected to the transmission path 61, the number of the selection terminals of the switch 14 is capable of being decreased. Consequently, since the off capacitance of the switches 13 and 14 is capable of being reduced, the transmission loss of the transmission signal passing through the switch 13 is reduced and the transmission loss of the reception signals passing through the switch 14 is reduced.

In addition, since no high-power transmission path is connected to the switch 14, it is optional to increase the voltage resistance of the selection terminals of the switch 14. Accordingly, it is optional to ensure the long distance between the terminals of the switch 14. In addition, the reception path 65 of Band G and the reception path 66 of Band H and Band J that may be used concurrently with the transmission of the transmission signal in Band A are not connected to the switch 14. Accordingly, the switch 14 is reduced in size.

Furthermore, since the transmission path 61 is connected to the reception paths 62 to 64 via the two-stage switches 13 and 14 that are cascade-connected to each other, the transmission signal and the harmonic waves of the transmission signal transmitted on the transmission path 61 are inhibited from flowing into the reception paths 62 to 64. Accordingly, it is possible to suppress the degradation of the isolation between the transmission path and the reception paths.

Furthermore, since the reception signals in Band G, Band H, and Band J that may be received concurrently with the transmission of the transmission signal in Band A are not through the switch 14, it is possible to reduce the transmission loss of these reception signals.

In the radio-frequency module 1A according to the present modification, the transmission filter may not be arranged on the transmission path 61 and the reception filters may not be arranged on the reception paths 62 to 66.

It is sufficient for at least one reception path (for example, the reception path 65) to be arranged as the reception path connected to the switch 13. It is sufficient for at least two reception paths (for example, the reception paths 62 and 63) to be arranged as the reception paths connected to the switch 14.

Figure 4:
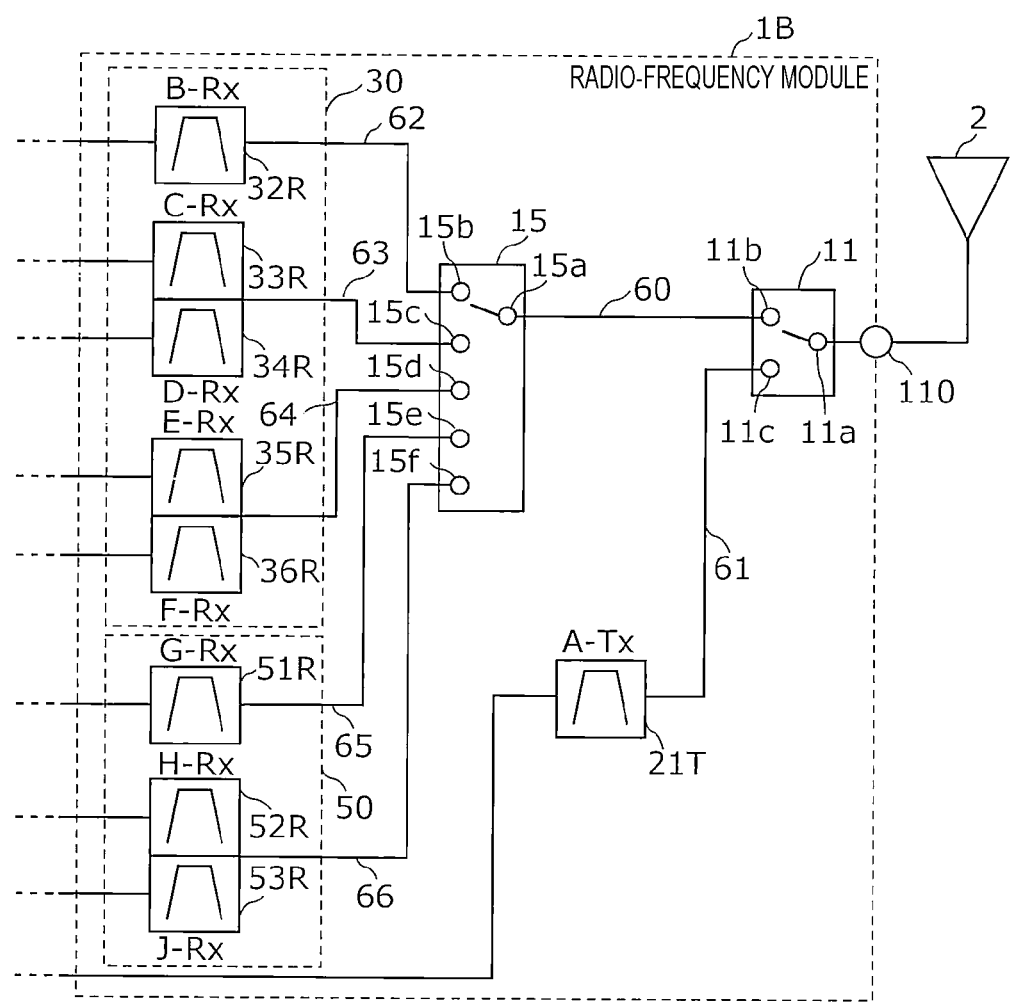
FIG. 4 is a circuit configuration diagram of a radio-frequency module according to a second modification of the first embodiment.

1. 3 Configuration of Radio-Frequency Module 1B According to Second Modification FIG. 4 is a circuit configuration diagram of a radio-frequency module 1B according to a second modification of the first embodiment. As illustrated in FIG. 4, the radio-radio-frequency module 1B includes the transmission-reception terminal 110, the transmission path 61, the reception paths 62, 63, 64, 65, and 66, the switch 11 and a switch 15, the transmission filter 21T, and the reception filters 32R, 33R, 34R, 35R, 36R, 51R, 52R, and 53R. The radio-frequency module 1B according to the present modification differs from the radio-frequency module 1A according to the first modification in that no reception path is connected to the first switch and in that the reception paths of Band G, Band H, and Band J, which are used concurrently with the transmission of the transmission signal in Band A, are connected to the second switch. A description of the same points of the radio-frequency module 1B according to the present modification as in the radio-frequency module 1A according to the first modification is omitted herein and points of the radio-frequency module 1B according to the present modification different from the radio-frequency module 1A according to the first modification are mainly described.

The switch 11 is the first switch that has the common terminal 11a (the first common terminal), the selection terminal 11b (the first selection terminal), and the selection terminal 11c (the second selection terminal) and that switches between connection between the common terminal 11a and the selection terminal 11b and connection between the common terminal 11a and the selection terminal 11c.

The switch 15 is the second switch that has a common terminal 15a (the second common terminal), a selection terminal 15b (the third selection terminal), a selection terminal 15c (the fourth selection terminal), a selection terminal 15d, a selection terminal 15e, and a selection terminal 15f. The switch 15 further has the selection terminals 15e and 15f, compared with the switch 14 in the radio-frequency module 1A. The switch 15 switches connection between the common terminal 15a and the selection terminals 15b to 15f with the above configuration.

The transmission path 61 is the first transmission path that has one end connected to the transmission terminal 130 (not illustrated in FIG. 4) and the other end connected to the selection terminal 11c and that transmits the transmission signal in Band A (the first communication band), which is input through the transmission terminal 130.

The reception path 62 is the first reception path that has one end connected to the reception terminal 120B (not illustrated in FIG. 4) and the other end connected to the selection terminal 15b and that transmits the reception signal in Band B (the second communication band), which is input through the transmission-reception terminal 110.

The reception path 63 is the second reception path that has one end connected to the reception terminal 120C (not illustrated in FIG. 4) and the other end connected to the selection terminal 15c and that transmits the reception signals in Band C (the third communication band) and Band D, which are input through the transmission-reception terminal 110.

The reception path 64 is a reception path that has one end connected to a reception terminal (not illustrated in FIG. 4) and the other end connected to the selection terminal 15d and that transmits the reception signals in Band E and Band F, which are input through the transmission-reception terminal 110.

The reception path 65 is a reception path that has one end connected to a reception terminal (not illustrated in FIG. 4) and the other end connected to the selection terminal 15e and that transmits the reception signal in Band G (the fourth communication band), which is input through the transmission-reception terminal 110.

The reception path 66 is a reception path that has one end connected to a reception terminal (not illustrated in FIG. 4) and the other end connected to the selection terminal 15f and that transmits the reception signals in Band H and Band J, which are input through the transmission-reception terminal 110.

The reception path 60 connecting the selection terminal 11b to the common terminal 15a composes the first reception path transmitting the reception signal in Band B, with the reception path 62. The reception path 60 composes the second reception path transmitting the reception signals in Band C and Band D, with the reception path 63. The reception path 60 composes the reception path transmitting the reception signals in Band E and Band F, with the reception path 64. The reception path 60 composes a reception path transmitting the reception signal in Band G, with the reception path 65. The reception path 60 composes a reception path transmitting the reception signals in Band H and Band J, with the reception path 66.

The transmission filter 21T uses the Band A transmission band as the passband. The input terminal of the transmission filter 21T is connected to the transmission terminal 130 (not illustrated in FIG. 4) via the transmission path 61 and the output terminal of the transmission filter 21T is connected to the selection terminal 11c via the transmission path 61.

The reception filter 32R uses the Band B reception band as the passband. The output terminal of the reception filter 32R is connected to the reception terminal 120B (not illustrated in FIG. 4) via the reception path 62 and the input terminal of the reception filter 32R is connected to the selection terminal 15b via the reception path 62.

The reception filter 33R uses the Band C reception band as the passband. The output terminal of the reception filter 33R is connected to the reception terminal 120C (not illustrated in FIG. 4) via the reception path 63 and the input terminal of the reception filter 33R is connected to the selection terminal 15c via the reception path 63.

The reception filter 34R uses the Band D reception band as the passband. The output terminal of the reception filter 34R is connected to a reception terminal (not illustrated in FIG. 4) via the reception path 63 and the input terminal of the reception filter 34R is connected to the selection terminal 15c via the reception path 63.

The reception filter 35R uses the Band E reception band as the passband. The output terminal of the reception filter 35R is connected to a reception terminal (not illustrated in FIG. 4) via the reception path 64 and the input terminal of the reception filter 35R is connected to the selection terminal 15d via the reception path 64.

The reception filter 36R uses the Band F reception band as the passband. The output terminal of the reception filter 36R is connected to a reception terminal (not illustrated in FIG. 4) via the reception path 64 and the input terminal of the reception filter 36R is connected to the selection terminal 15d via the reception path 64.

The reception filter 51R uses the Band G reception band as the passband. The output terminal of the reception filter 51R is connected to a reception terminal (not illustrated in FIG. 4) via the reception path 65 and the input terminal of the reception filter 51R is connected to the selection terminal 15e via the reception path 65.

The reception filter 52R uses the Band H reception band as the passband. The output terminal of the reception filter 52R is connected to a reception terminal (not illustrated in FIG. 4) via the reception path 66 and the input terminal of the reception filter 52R is connected to the selection terminal 15f via the reception path 66.

The reception filter 53R uses the Band J reception band as the passband. The output terminal of the reception filter 53R is connected to a reception terminal (not illustrated in FIG. 4) via the reception path 66 and the input terminal of the reception filter 53R is connected to the selection terminal 15f via the reception path 66.

The reception filters 32R, 33R, 34R, 35R, and 36R belong to a first filter group 30 arranged on the reception paths that are not used concurrently with the transmission of the transmission signal in Band A.

The reception filters 51R, 52R, and 53R belong to a second filter group 50 arranged on the reception paths capable of being used concurrently with the transmission of the transmission signal in Band A.

The common terminal 11a is connected to the transmission-reception terminal 110. The selection terminal 11b is connected to the common terminal 15a. The selection terminal 11c is connected to the other end of the transmission path 61. The selection terminal 15b is connected to the other end of the reception path 62. The selection terminal 15c is connected to the other end of the reception path 63.

The switch 15 is connected only to the reception paths, among the transmission path on which the transmission signal is transmitted and the reception paths on which the reception signals are transmitted.

In the radio-frequency module 1B according to the present modification, with the above configuration, the transmission of the transmission signal in Band A on the transmission path 61 is performed concurrently with the transmission of the reception signal in Band G on the reception path 65. The transmission of the transmission signal in Band A on the transmission path 61 is performed concurrently with the transmission of the reception signal in Band H on the reception path 66. The transmission of the transmission signal in Band A on the transmission path 61 is performed concurrently with the transmission of the reception signal in Band J on the reception path 66.

For example, when the transmission signal in Band A and the reception signal in Band G are concurrently transmitted, the common terminal 11a and the selection terminal 11b are in the connection state and the common terminal 11a and the selection terminal 11c are in the connection state in the switch 11. The common terminal 15a and the selection terminal 15e are in the connection state in the switch 15. In this state, the transmission signal in Band A is supplied to the antenna 2 via the transmission terminal 130 (not illustrated in FIG. 4), the transmission path 61 and the transmission filter 21T, the selection terminal 11c, the common terminal 11a, and the transmission-reception terminal 110. Concurrently, the reception signal in Band G is supplied from the reception terminal (not illustrated in FIG. 4) to the reception amplifier (not illustrated in FIG. 4) via the antenna 2, the transmission-reception terminal 110, the common terminal 11a, the selection terminal 11b, the reception path 60, the common terminal 15a, the selection terminal 15e, and the reception path 65 and the reception filter 51R.

The transmission of the reception signal in Band B on the reception path 62 and the transmission of the transmission signal in Band A on the transmission path 61 are exclusively performed. The transmission of the reception signal in Band C on the reception path 63 and the transmission of the transmission signal in Band A on the transmission path 61 are exclusively performed. The transmission of the reception signal in Band D on the reception path 63 and the transmission of the transmission signal in Band A on the transmission path 61 are exclusively performed. The transmission of the reception signal in Band E on the reception path 64 and the transmission of the transmission signal in Band A on the transmission path 61 are exclusively performed. The transmission of the reception signal in Band F on the reception path 64 and the transmission of the transmission signal in Band A on the transmission path 61 are exclusively performed.

For example, when the reception signal in Band B is transmitted, the common terminal 11a and the selection terminal 11b are in the connection state and the common terminal 11a and the selection terminal 11c are in the non-connection state in the switch 11. The common terminal 15a and the selection terminal 15b are in the connection state in the switch 15. In this case, the reception signal in Band B is supplied to the reception amplifier 42R (not illustrated in FIG. 4) via the antenna 2, the transmission-reception terminal 110, the common terminal 11a, the selection terminal 11b, the reception path 60, the common terminal 15a, the selection terminal 15b, the reception path 62 and the reception filter 32R, and the reception terminal 120B (not illustrated in FIG. 4).

According to the radio-frequency module 1B according to the present modification, the switch 15 to which the reception paths 62 to 66 are connected is different from the switch 11 to which the transmission path 61 is connected. Specifically, the switch 15 is not connected to the transmission path and is connected only to the reception paths. Accordingly, since the switch 11 is not connected to the reception paths 62 to 66, the number of the selection terminals of the switch 11 is capable of being decreased. In addition, since the switch 15 is not connected to the transmission path 61, the number of the selection terminals of the switch 15 is capable of being decreased. Consequently, since the off capacitance of the switches 11 and 15 is capable of being reduced, the transmission loss of the transmission signal passing through the switch 11 is reduced and the transmission loss of the reception signals passing through the switch 15 is reduced.

In addition, since no high-power transmission path is connected to the switch 15, it is optional to increase the voltage resistance of the selection terminals of the switch 15.

Accordingly, it is optional to ensure the long distance between the terminals of the switch 15. Accordingly, the switch 15 is reduced in size.

Furthermore, since the transmission path 61 is connected to the reception paths 62 to 66 via the two-stage switches 11 and 15 that are cascade-connected to each other, the transmission signal and the harmonic waves of the transmission signal transmitted on the transmission path 61 are inhibited from flowing into the reception paths 62 to 66. Accordingly, it is possible to suppress the degradation of the isolation between the transmission path and the reception paths.

In the radio-frequency module 1B according to the present modification, the transmission filter may not be arranged on the transmission path 61 and the reception filters may not be arranged on the reception paths 62 to 66. It is sufficient for at least the reception paths 62 and 65 to be arranged as the reception paths connected to the switch 15.

Second Embodiment

In the present embodiment, the configuration of a radio-frequency module capable of suppressing degradation of the receiving sensitivity of the reception signal received concurrently with the transmission of the transmission signal will be described against the radio-frequency module according to the first embodiment.

2. 1 Configuration of Radio-Frequency Module 1C and Communication Apparatus

Figure 5:
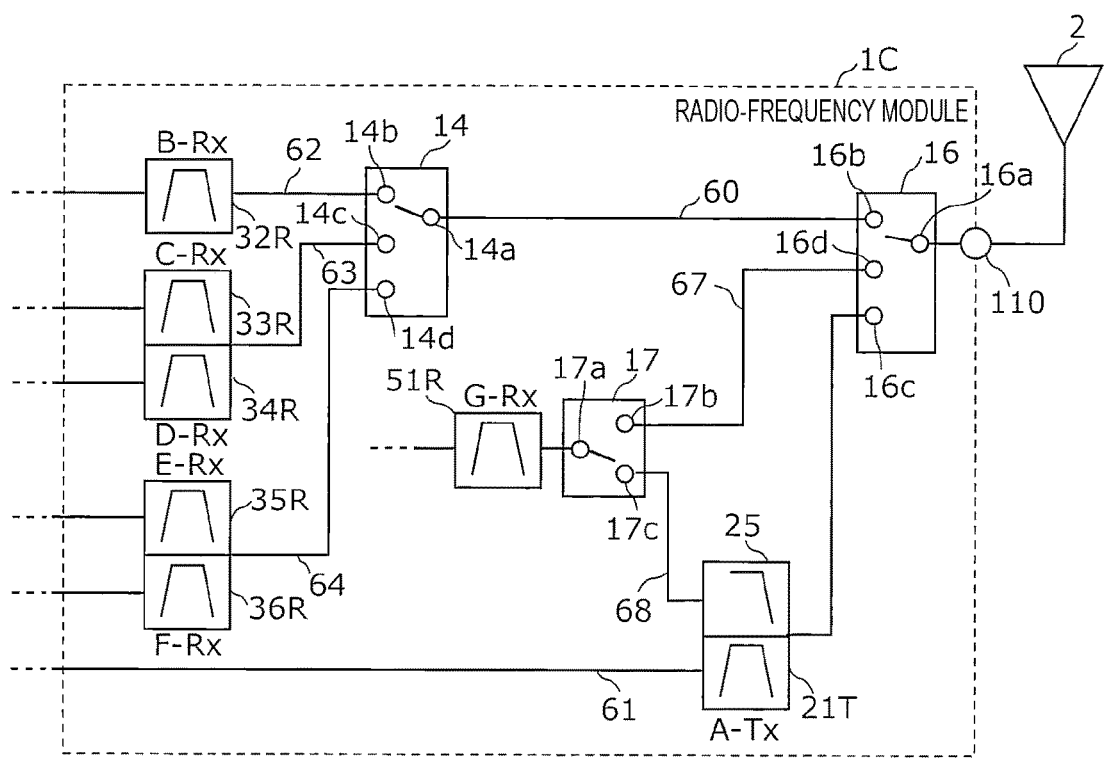
FIG. 5 is a circuit configuration diagram of a radio-frequency module according to a second embodiment.

FIG. 5 is a circuit configuration diagram of a radio-frequency module 1C according to a second embodiment. As illustrated in FIG. 5, the radio-frequency module 1C includes the transmission-reception terminal 110, the transmission path 61, the reception paths 60, 62, 63, and 64 and reception paths 67 and 68, the switch 14 and switches 16 and 17, the transmission filter 21T, the reception filters 32R, 33R, 34R, 35R, 36R, and 51R, and a filter 25. The radio-frequency module 1C according to the present embodiment differs from the radio-frequency module 1A according to the first modification of the first embodiment in the circuit configuration of the signal paths connected to the first switch. A description of the same points of the radio-frequency module 1C according to the present embodiment as in the radio-frequency module 1A according to the first modification of the first embodiment is omitted herein and points of the radio-frequency module 1C according to the present embodiment different from the radio-frequency module 1A according to the first modification of the first embodiment are mainly described.

The switch 16 is the first switch that has a common terminal 16a (the first common terminal), a selection terminal 16b (the first selection terminal), a selection terminal 16c (the second selection terminal), and a selection terminal 16d (the fifth selection terminal). The switch 16 switches connection between the common terminal 16a and the election terminals 16b to 16d with the above terminal configuration. More specifically, the switch 16 exclusively performs connection between the common terminal 16a and the election terminal 16b and connection between the common terminal 16a and the selection terminal 16d. The switch 16 exclusively performs connection between the common terminal 16a and the selection terminal 16c and connection between the common terminal 16a and the selection terminal 16d.

The switch 17 is a third switch that has a common terminal 17a (a third common terminal), a selection terminal 17b (a sixth selection terminal), and a selection terminal 17c (a seventh selection terminal) and that switches connection between the common terminal 17a and the selection terminal 17b and connection between the common terminal 17a and the selection terminal 17c.

The transmission path 61 is the first transmission path that has one end connected to the transmission terminal 130 (not illustrated in FIG. 5) and the other end connected to the selection terminal 16c and that transmits the transmission signal in Band A (the first communication band), which is input through the transmission terminal 130.

The reception path 67 is the third reception path that has one end connected to a reception terminal (not illustrated in FIG. 5) and the other end connected to the selection terminal 16d (the fifth selection terminal) and that transmits the reception signal in Band G (the fourth communication band), which is input through the transmission-reception terminal 110.

The reception filter 51R is a first reception filter that is arranged on the reception path 67 and that uses the Band G (the fourth communication band) reception band as the passband. The input terminal of the reception filter 51R is connected to the common terminal 17a and the output terminal of the reception filter 51R is connected to a reception terminal (not illustrated in FIG. 5).

The transmission filter 21T uses the Band A (the first communication band) transmission band as the passband. The input terminal of the transmission filter 21T is connected to the transmission terminal 130 (not illustrated in FIG. 5) via the transmission path 61 and the output terminal of the transmission filter 21T is connected to the selection terminal 16c via the transmission path 61.

The filter 25 is a second filter using the Band A transmission band as an attenuation band. The input terminal of the filter 25 is connected to the selection terminal 16c and the output terminal of the filter 25 is connected to the selection terminal 17c.

The reception path 68 is a path connecting the selection terminal 16c to the input terminal of the reception filter 51R and is a reception path on which the filter 25 is arranged. In the present embodiment, the reception path 68 serves as a path connecting the selection terminal 16c to the switch 17 connected to the input terminal of the reception filter 51R.

Although a surface acoustic wave filter, an acoustic wave filter using the BAWs, an LC resonant filter, a dielectric filter, and the like are exemplified as the filter 25, the material and the structure of these filters are not limited.

The path connecting the selection terminal 16d to the selection terminal 17b, in the reception path 67, is a first bypass path on which no filter is arranged.

The switch 17 is an optional component in the radio-frequency module 1C. Specifically, the radio-frequency module 1C may have a configuration in which one end of the reception path 67 and one end of the reception path 68 are directly connected to the input terminal of the reception filter 51R.

Figure 6:
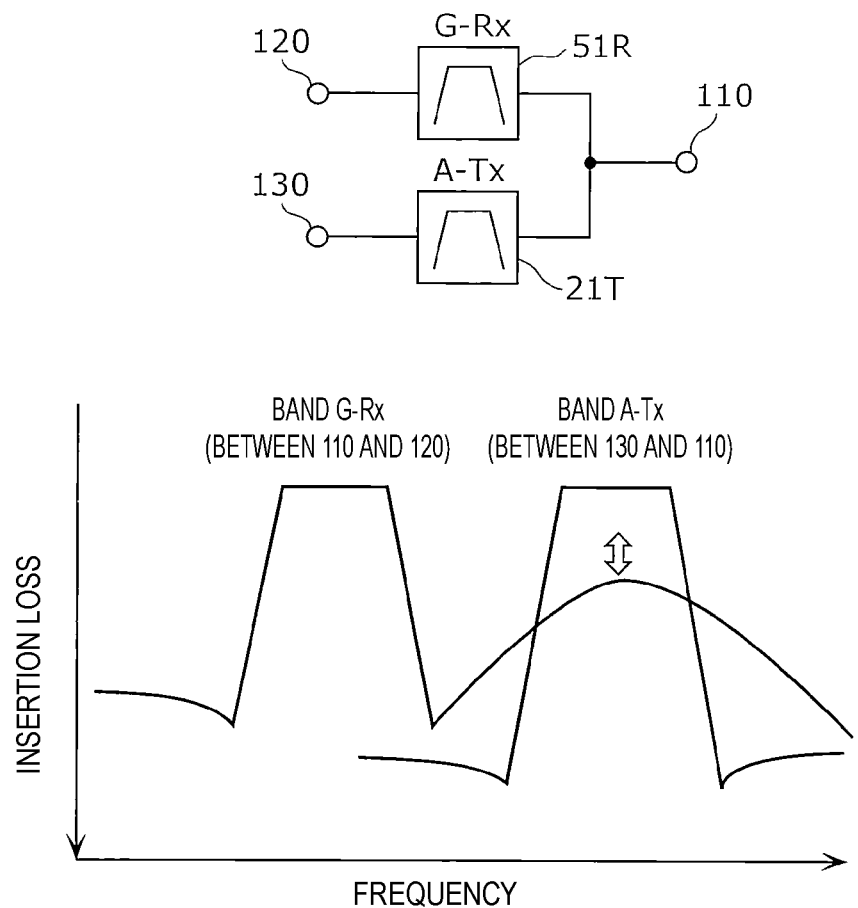
FIG. 6 is a diagram for describing the cause of degradation of the receiving sensitivity of a multiplexer in which a transmission filter and a reception filter are commonly connected.

FIG. 6 is a diagram for describing the cause of the degradation of the receiving sensitivity of a multiplexer in which the transmission filter 21T and the reception filter 51R are commonly connected to the transmission-reception terminal 110. The circuit configuration of a multiplexer according to a comparative example, which is composed of the transmission filter 21T and the reception filter 51R, is illustrated in an upper portion of FIG. 6. An example of rough bandpass characteristics of the transmission filter 21T and the reception filter 51R is indicated in a lower portion of FIG. 6.

As indicated in the lower portion of FIG. 6, a band having reduced attenuation (a band having degraded attenuation characteristics) appears in a band higher than the passband in the bandpass characteristics of the reception filter using the Band G reception band (Band G-Rx) as the passband. A case is supposed in which the area having the degraded attenuation characteristics is overlapped with the passband of the transmission filter 21T (Band A-Tx). When the reception signal in Band G and the transmission signal in Band A are concurrently transmitted and received in this frequency relationship, part of the transmission signal in Band A passing through the transmission terminal 130 and the transmission filter 21T enters into the reception filter 51R and leaks to a reception terminal 120. As a result, the leaking transmission signal in Band A becomes noise in the RFIC connected to the reception terminal 120 and the receiving sensitivity of the reception signal in Band G is degraded.

In contrast, according to the radio-frequency module 1C according to the present embodiment, although the transmission signal in Band A, which is input through the transmission terminal 130, passes through the transmission filter 21T even when the reception filter 51R has the attenuation characteristics illustrated in FIG. 6 and the band having the degraded attenuation is overlapped with the passband of the transmission filter 21T, the transmission of the transmission signal in Band A to the reception path 68 is attenuated owing to the filter 25. This is because the filter 25 uses the Band A transmission band as the attenuation band and the input terminal of the filter 25 and the output terminal of the transmission filter 21T are commonly connected to the selection terminal 16c.

In other words, according to the radio-frequency module 1C according to the present embodiment, it is possible to suppress the degradation of the receiving sensitivity in a system capable of concurrently transmitting and receiving the transmission signal and the reception signal. When the reception signal in Band G is transmitted and the transmission signal in Band A is not transmitted, the reception signal does not pass through the reception path 68 and is caused to pass through the reception path 67, which is the bypass path. Accordingly, the reception signal in Band G is capable of being transmitted with low loss without necessarily the degradation caused by the insertion loss of the filter 25.

In the present embodiment, Band G may be positioned at the higher side of Band A or Band G may be positioned at the lower side of Band A.

When the reception filter 51R is, for example, an acoustic wave filter, a case is supposed in which a band having decreased attenuation (an area having degraded attenuation characteristics) appears at the higher side of the passband. A case is supposed in which this band is overlapped with the passband of the transmission filter 21T. In other words, a case is supposed in which Band G and Band A have the frequency relationship indicated in FIG. 6 and the Band A transmission band is positioned at the higher side of the Band G reception band.

In this case, the arrangement of the filter 25 inhibits the receiving sensitivity of the reception signal in Band G from being degraded and the reception signal in Band G is capable of being transmitted with low loss due to the reception path 67 (the bypass path). When the Band A transmission band is positioned at the higher side of the Band G reception band, the filter 25 may be a low pass filter using the Band A transmission band as the attenuation band and the Band G reception band as the passband. The filter 25 may be a notch filter using the Band A transmission band as the attenuation band and another band as the passband.

The circuit state when the reception signal in Band G is transmitted in the radio-frequency module 1C will now be described. When the reception signal in Band G is transmitted and the transmission signal in Band A is not transmitted, the common terminal 16a and the selection terminal 16d are in the connection state and the common terminal 16a and the selection terminal 16c are in the non-connection state in the switch 16. The common terminal 17a and the selection terminal 17b are in the connection state and the common terminal 17a and the selection terminal 17c are in the non-connection state in the switch 17.

In this state, the reception signal in Band G is supplied from the reception terminal (not illustrated in FIG. 5) to the reception amplifier (not illustrated in FIG. 5) via the transmission-reception terminal 110, the common terminal 16a, the selection terminal 16d, the reception path 67, the selection terminal 17b, the common terminal 17a, and the reception filter 51R.

With the above connection configuration, since the transmission signal in Band A does not interfere with the reception signal in Band G when the reception signal in Band G is transmitted and the transmission signal in Band A is not transmitted, it is optional for the reception signal in Band G to pass through the filter 25. Accordingly, since it is sufficient for the reception signal in Band G to pass through the reception path 67, which is the bypass path, the reception signal in Band G is capable of being transmitted with low loss without necessarily the degradation caused by the insertion loss of the filter 25.

Next, the circuit state when the reception signal in Band G and the transmission signal in Band A are concurrently transmitted in the radio-frequency module 1C will now be described. When the reception signal in Band G and the transmission signal in Band A are concurrently transmitted, the common terminal 16a and the selection terminal 16c are in the connection state and the common terminal 16a and the selection terminal 16d are in the non-connection state in the switch 16. The common terminal 17a and the selection terminal 17c are in the connection state and the common terminal 17a and the selection terminal 17b are in the non-connection state in the switch 17.

In this case, the reception signal in Band G is supplied from the reception terminal (not illustrated in FIG. 5) to the reception amplifier (not illustrated in FIG. 5) via the transmission-reception terminal 110, the common terminal 16a, the selection terminal 16c, the filter 25 and the reception path 68, the selection terminal 17c, and the common terminal 17a and the reception filter 51R. The transmission signal in Band A is supplied from the transmission-reception terminal 110 to the antenna 2 via the transmission amplifier 41T (not illustrated in FIG. 5), the transmission terminal 130 (not illustrated in FIG. 5), the transmission filter 21T and the transmission path 61, the selection terminal 16c, and the common terminal 16a.

With the above connection configuration, although the transmission signal in Band A input through the transmission terminal 130 (not illustrated in FIG. 5) passes through the transmission filter 21T, the transmission of the transmission signal in Band A to the reception path 68 is excluded as much as possible due to the filter 25 and the transmission signal in Band A is transmitted to the transmission-reception terminal 110 via the switch 16 with low loss. In addition, since the transmission signal in Band A is excluded as much as possible from the reception signal passing through the reception filter 51R, it is possible to suppress the degradation of the receiving sensitivity of the reception signal in Band G.

According to the radio-frequency module 1C according to the present embodiment, the switch 14 to which the reception paths 62, 63, and 64 are connected is different from the switch 16 to which the transmission path 61 is connected.

Specifically, the switch 14 is not connected to the transmission path and is connected only to the reception paths. Accordingly, since the switch 16 is not connected to the reception paths 62 to 64, the number of the selection terminals of the switch 16 is capable of being decreased. In addition, since the switch 14 is not connected to the transmission path 61, the number of the selection terminals of the switch 14 is capable of being decreased. Consequently, since the off capacitance of the switches 16 and 14 is capable of being reduced, the transmission loss of the transmission signal passing through the switch 16 is reduced and the transmission loss of the reception signals passing through the switch 14 is reduced.

In addition, since no high-power transmission path is connected to the switch 14, it is not necessary to increase the voltage resistance of the selection terminals of the switch 14. Accordingly, it is not necessary to ensure the long distance between the terminals of the switch 14. Furthermore, the reception paths 67 and 68 of Band G, which may be used concurrently with the transmission of the transmission signal in Band A, are not connected to the switch 14. Accordingly, the switch 14 is reduced in size.

Furthermore, since the transmission path 61 is connected to the reception paths 62 to 64 via the two-stage switches 16 and 14 that are cascade-connected to each other, the transmission signal and the harmonic waves of the transmission signal transmitted on the transmission path 61 are inhibited from flowing into the reception paths 62 to 64. Accordingly, it is possible to suppress the degradation of the isolation between the transmission path and the reception paths.

Furthermore, since the reception signal in Band G that may be received concurrently with the transmission of the transmission signal in Band A is not through the switch 14, it is possible to reduce the transmission loss of these reception signals.

When the reception signal in Band G is received and the transmission signal in Band A is not transmitted, it is possible to transmit the reception signal in Band G with low loss. When the transmission signal in Band A and the reception signal in Band G are concurrently transmitted and received, it is possible to suppress the degradation of the receiving sensitivity of the reception signal in Band G.

Band G may be the same as Band A. In this case, the reception filter 51R and the transmission filter 21T function as a duplexer that transmits and receives the radio-frequency signal in one communication band. However, the radio-frequency module 1C according to the present embodiment does not have the configuration in which the input terminal of the reception filter 51R and the output terminal of the transmission filter 21T are commonly connected, unlike the duplexer in the related art, and have the configuration in which the filter 25 connected to the upstream of the reception filter 51R and the transmission filter 21T are commonly connected with the selection terminal 16c.

In a communication apparatus including the radio-frequency module 1C according to the present embodiment, the gain of the reception amplifier in the amplification of the reception signal transmitted on the reception path 68 may be higher than the gain of the reception amplifier in the amplification of the reception signal transmitted on the reception path 67.

Since the reception signal in Band G passes through the filter 25 when the reception signal in Band G is transmitted on the reception path 68, the intensity of the reception signal in Band G, which is input into the reception amplifier, is lower than that in the case in which the reception signal in Band G is transmitted on the reception path 67 by the amount corresponding to the insertion loss of the filter 25. Against this, adjusting the gain of the reception amplifier in the above manner enables the intensity of the reception signal in Band G on the reception path 68 (when the reception signal in Band G and the transmission signal in Band A are concurrently transmitted) to be matched with the intensity of the reception signal in Band G on the reception path 67 (when the reception signal in Band G is transmitted and the Band A transmission signal is not transmitted) at the output stage of the reception amplifier.

The control unit provided in the RFIC 4, the BBIC 5, or the radio-frequency module 1C controls the gain of the reception amplifier in accordance with information indicating whether concurrent transmission of Band G and Band A or single transmission of Band G or Band A is performed.

In the radio-frequency module 1C according to the present embodiment, no reception filter may be arranged on each of the reception paths 62 to 64. It is sufficient to arrange at least the reception paths 62 and 63 as the reception paths connected to the switch 14. In addition, two or more reception filters including the reception filter 51R may be connected to the switch 17.

2. 2 Configuration of Radio-Frequency Module 1E According to First Modification

Figure 7:
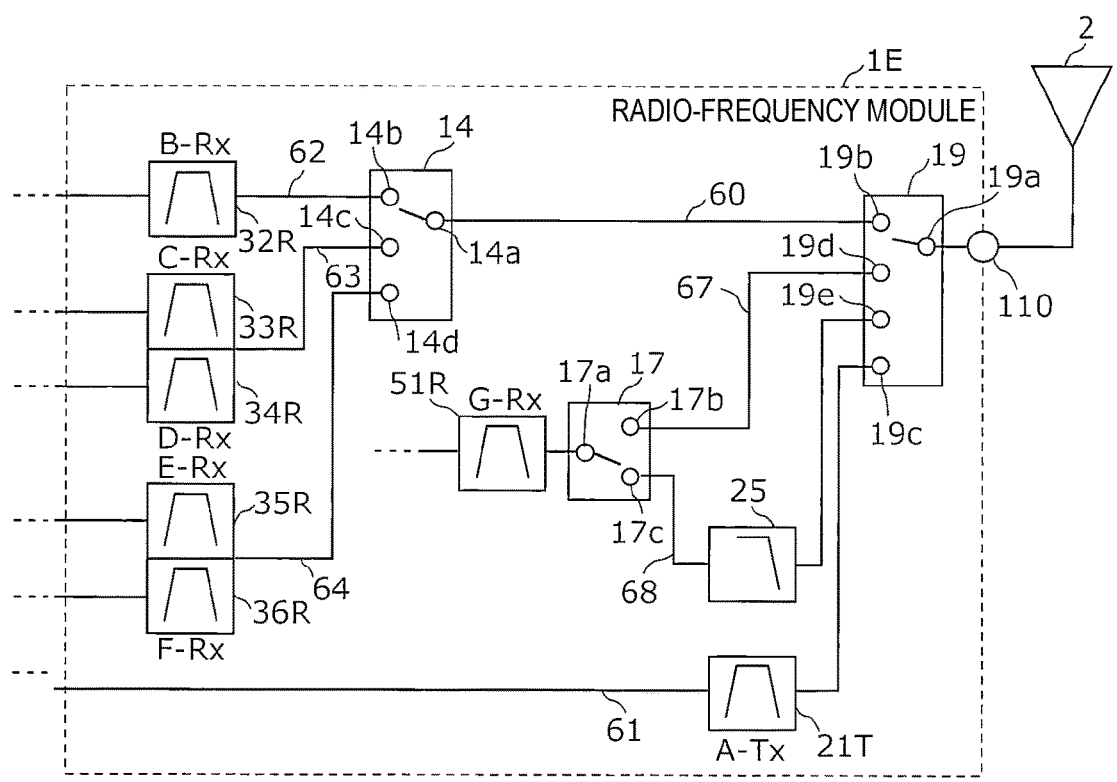
FIG. 7 is a circuit configuration diagram of a radio-frequency module according to a first modification of the second embodiment.

FIG. 7 is a circuit configuration diagram of a radio-frequency module 1E according to a first modification of the second embodiment. As illustrated in FIG. 7, the radio-frequency module 1E includes the transmission-reception terminal 110, the transmission path 61, the reception paths 60, 62, 63, 64, 67, and 68, the switches 14 and 17 and a switch 19, the transmission filter 21T, the reception filters 32R, 33R, 34R, 35R, 36R, and 51R, and the filter 25. The radio-frequency module 1E according to the present modification differs from the radio-frequency module 1C according to the second embodiment in the connection configuration of the switch 19 and the filter 25. A description of the same points of the radio-frequency module 1E according to the present modification as in the radio-frequency module 1C according to the second embodiment is omitted herein and points of the radio-frequency module 1E according to the present modification different from the radio-frequency module 1C according to the second embodiment are mainly described.

The switch 19 is the first switch having a common terminal 19a (the first common terminal), a selection terminal 19b (the first selection terminal), a selection terminal 19c (the second selection terminal), a selection terminal 19d (the fifth selection terminal), and a selection terminal 19e. The switch 19 switches connection between the common terminal 19a and the selection terminals 19b to 19e with the above configuration. More specifically, the switch 19 exclusively performs connection between the common terminal 19a and the selection terminal 19b and connection between the common terminal 19a and the selection terminal 19d. The switch 19 exclusively performs connection between the common terminal 19a and the selection terminal 19c and connection between the common terminal 19a and the selection terminal 19d. The switch 19 concurrently performs connection between the common terminal 19a and the selection terminal 19c and connection between the common terminal 19a and the selection terminal 19e. In other words, since the selection terminal 19e is connected to the common terminal 19a when the selection terminal 19c is connected to the common terminal 19a, the selection terminal 19e corresponds to the second selection terminal, like the selection terminal 19c.

The transmission filter 21T uses the Band A (the first communication band) transmission band as the passband. The input terminal of the transmission filter 21T is connected to the transmission terminal 130 (not illustrated in FIG. 7) via the transmission path 61 and the output terminal of the transmission filter 21T is connected to the selection terminal 19c via the transmission path 61.

The filter 25 is the second filter using the Band A transmission band as the attenuation band. The input terminal of the filter 25 is connected to the selection terminal 19e and the output terminal of the filter 25 is connected to the selection terminal 17c.

The reception path 68 is a path connecting the selection terminal 19e to the input terminal of the reception filter 51R and is a reception path on which the filter 25 is arranged. In the present embodiment, the reception path 68 serves as a path connecting the selection terminal 19e to the switch 17 connected to the input terminal of the reception filter 51R.

The path connecting the selection terminal 19d to the selection terminal 17b, in the reception path 67, is the first bypass path on which no filter is arranged.

According to the radio-frequency module 1E according to the present modification, although the transmission signal in Band A, which is input through the transmission terminal 130, passes through the transmission filter 21T even when the reception filter 51R has the attenuation characteristics illustrated in FIG. 6 and the band having the degraded attenuation is overlapped with the passband of the transmission filter 21T, the transmission of the transmission signal in Band A to the reception path 68 is attenuated owing to the filter 25. This is because the filter 25 uses the Band A transmission band as the attenuation band, the input terminal of the filter 25 is connected to the selection terminal 19e, the transmission filter 21T is connected to the selection terminal 19c, and the connection between the common terminal 19a and the selection terminal 19c and the connection between the common terminal 19a and the selection terminal 19e are concurrently performed.

In other words, according to the radio-frequency module 1E according to the present modification, it is possible to suppress the degradation of the receiving sensitivity in a system capable of concurrently transmitting and receiving the transmission signal and the reception signal. When the reception signal in Band G is transmitted and the transmission signal in Band A is not transmitted, the reception signal does not pass through the reception path 68 and is caused to pass through the reception path 67, which is the bypass path. Accordingly, the reception signal in Band G is capable of being transmitted with low loss without necessarily the degradation caused by the insertion loss of the filter 25.

2. 3 Configuration of Reception Module 1D According to Second Modification

Figure 8:
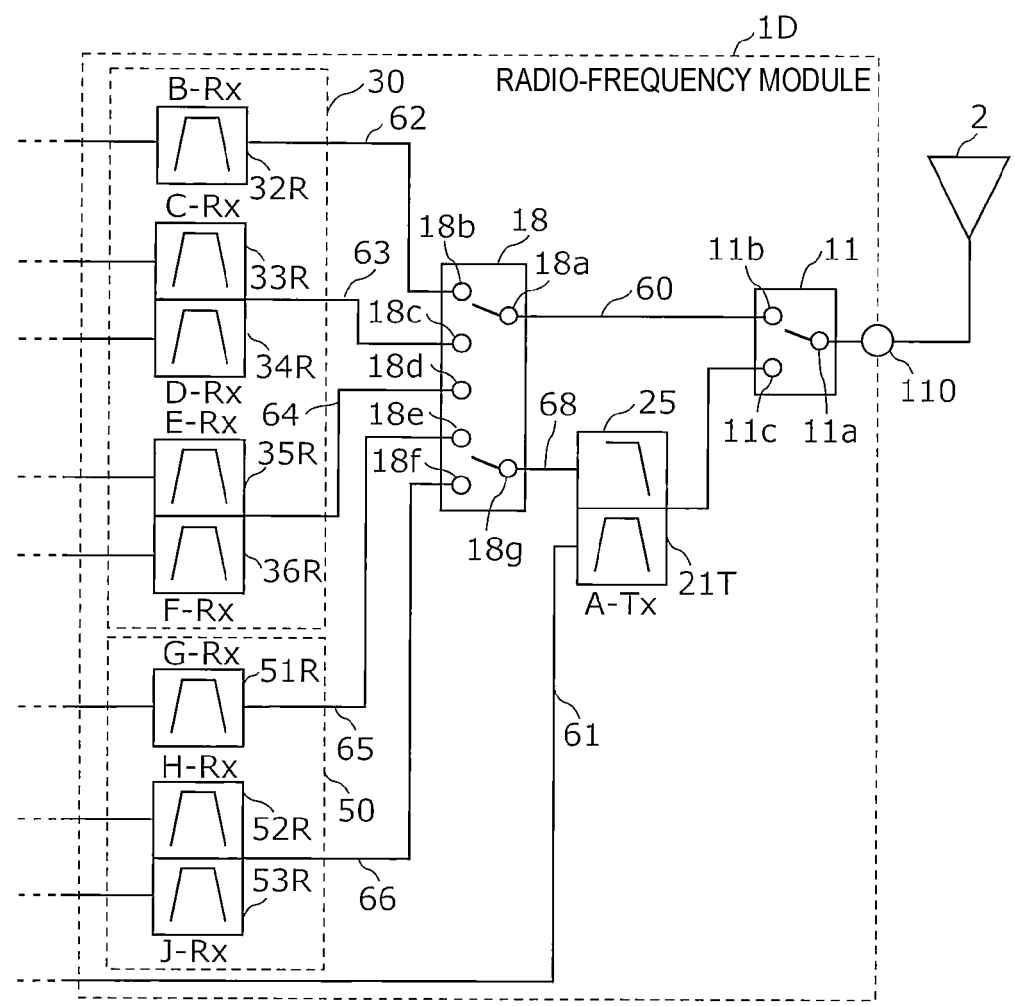
FIG. 8 is a circuit configuration diagram of a radio-frequency module according to a second modification of the second embodiment.

FIG. 8 is a circuit configuration diagram of a radio-frequency module 1D according to a second modification of the second embodiment. As illustrated in FIG. 8, the radio-frequency module 1D includes the transmission-reception terminal 110, the transmission path 61, the reception paths 60, 62, 63, 64, 65, 66, and 68, the switch 11 and a switch 18, the transmission filter 21T, the reception filters 32R, 33R, 34R, 35R, 36R, 51R, 52R, and 53R, and the filter 25. The radio-frequency module 1D according to the present modification differs from the radio-frequency module 1C according to the second embodiment in that the reception filter receiving the signal concurrently with the transmission of the transmission signal is connected to the switch 18. A description of the same points of the radio-frequency module 1D according to the present modification as in the radio-frequency module 1C according to the second embodiment is omitted herein and points of the radio-frequency module 1D according to the present modification different from the radio-frequency module 1C according to the second embodiment are mainly described.

The switch 11 is the first switch that has the common terminal 11a (the first common terminal), the selection terminal 11b (the first selection terminal), and the selection terminal 11c (the second selection terminal). The switch 11 switches between connection between the common terminal 11a and the selection terminal 11b and connection between the common terminal 11a and the selection terminal 11c.

The switch 18 is the second switch that has a common terminal 18a (the second common terminal), a common terminal 18g (a fourth common terminal), a selection terminal 18b (the third selection terminal), a selection terminal 18c (the fourth selection terminal), a selection terminal 18d, a selection terminal 18e (an eighth selection terminal), and a selection terminal 18f. The switch 18 further has the selection terminals 18e and 18f, compared with the switch 14 in the radio-frequency module 1C. The switch 18 switches connection between the common terminal 18a and the selection terminals 18b to 18f and switches connection between the common terminal 18g and the selection terminals 18e to 18f with the above configuration.

The transmission path 61 is the first transmission path that has one end connected to the transmission terminal 130 (not illustrated in FIG. 8) and the other end connected to the selection terminal 11c and that transmits the transmission signal in Band A (the first communication band), which is input through the transmission terminal 130.

The reception path 65 is the third reception path that is connected to the selection terminal 18e (the eighth selection terminal) and that transmits the reception signal in Band G (the fourth communication band), which is input through the transmission-reception terminal 110.

The reception filter 51R is the first reception filter that is arranged on the reception path 65 and that uses the Band G (the fourth communication band) reception band as the passband. The input terminal of the reception filter 51R is connected to the selection terminal 18e via the reception path 65 and the output terminal of the reception filter 51R is connected to a reception terminal (not illustrated in FIG. 8).

The transmission filter 21T uses the Band A (the first communication band) transmission band as the passband. The input terminal of the transmission filter 21T is connected to the transmission terminal 130 (not illustrated in FIG. 8) via the transmission path 61 and the output terminal of the transmission filter 21T is connected to the selection terminal 11c via the transmission path 61.

The filter 25 is the second filter using the Band A transmission band as the attenuation band. The input terminal of the filter 25 is connected to the selection terminal 11c and the output terminal of the filter 25 is connected to the common terminal 18g.

The reception path 68 is a path connecting the selection terminal 11c to the common terminal 18g and is a reception path on which the filter 25 is arranged.

The reception path 60 connecting the selection terminal 11b to the common terminal 18a is the first bypass path on which no filter is arranged.

The radio-frequency module 1D is capable of concurrently performing the transmission of the transmission signal in Band A on the transmission path 61 and the transmission of the reception signal in Band G on the reception path 65 with the above configuration.

According to the radio-frequency module 1D according to the present modification, although the transmission signal in Band A, which is input through the transmission terminal 130, passes through the transmission filter 21T even when the reception filter 51R has the attenuation characteristics illustrated in FIG. 6 and the band having the degraded attenuation is overlapped with the passband of the transmission filter 21T, the transmission of the transmission signal in Band A to the reception path 68 is attenuated owing to the filter 25. In other words, according to the radio-frequency module 1D according to the present modification, it is possible to suppress the degradation of the receiving sensitivity in a system capable of concurrently transmitting and receiving the transmission signal and the reception signal. When the reception signal in Band G is transmitted and the transmission signal in Band A is not transmitted, the reception signal does not pass through the reception path 68 and is caused to pass through the reception path 60, which is the bypass path. Accordingly, the reception signal in Band G is capable of being transmitted with low loss without necessarily the degradation caused by the insertion loss of the filter 25.

The circuit state when the reception signal in Band G is transmitted in the radio-frequency module 1D will now be described. When the reception signal in Band G is transmitted and the transmission signal in Band A is not transmitted, the common terminal 11a and the selection terminal 11b are in the connection state and the common terminal 11a and the selection terminal 11c are in the non-connection state in the switch 11. The common terminal 18a and the selection terminal 18e are in the connection state and the common terminal 18g and the selection terminal 18e are in the non-connection state in the switch 18.

In this state, the reception signal in Band G is supplied from the reception terminal (not illustrated in FIG. 8) to the reception amplifier (not illustrated in FIG. 8) via the transmission-reception terminal 110, the common terminal 11a, the selection terminal 11b, the reception path 60, the common terminal 18a, the selection terminal 18e, and the reception filter 51R.

With the above connection configuration, since the transmission signal in Band A does not interfere with the reception signal in Band G when the reception signal in Band G is transmitted and the transmission signal in Band A is not transmitted, it is not necessary for the reception signal in Band G to pass through the filter 25. Accordingly, since it is sufficient for the reception signal in Band G to pass through the reception path 60, which is the bypass path, the reception signal in Band G is capable of being transmitted with low loss without necessarily the degradation caused by the insertion loss of the filter 25.

Next, the circuit state when the reception signal in Band G and the transmission signal in Band A are concurrently transmitted in the radio-frequency module 1D will now be described. When the reception signal in Band G and the transmission signal in Band A are concurrently transmitted, the common terminal 11a and the selection terminal 11c are in the connection state and the common terminal 11a and the selection terminal 11b are in the non-connection state in the switch 11. The common terminal 18a and the selection terminal 18e are in the non-connection state and the common terminal 18g and the selection terminal 18e are in the connection state in the switch 18.

In this case, the reception signal in Band G is supplied from the reception terminal (not illustrated in FIG. 8) to the reception amplifier (not illustrated in FIG. 8) via the transmission-reception terminal 110, the common terminal 11a, the selection terminal 11c, the filter 25 and the reception path 68, the common terminal 18g, the selection terminal 18e, and the reception filter 51R. The transmission signal in Band A is supplied from the transmission-reception terminal 110 to the antenna 2 via the transmission amplifier 41T (not illustrated in FIG. 8), the transmission terminal 130 (not illustrated in FIG. 8), the transmission filter 21T and the transmission path 61, selection terminal 11c, and the common terminal 11a.

With the above connection configuration, although the transmission signal in Band A input through the transmission terminal 130 (not illustrated in FIG. 8) passes through the transmission filter 21T, the transmission of the transmission signal in Band A to the reception path 68 is excluded as much as possible due to the filter 25 and the transmission signal in Band A is transmitted to the transmission-reception terminal 110 via the switch 11 with low loss. In addition, since the transmission signal in Band A is excluded as much as possible from the reception signal passing through the reception filter 51R, it is possible to suppress the degradation of the receiving sensitivity of the reception signal in Band G.

According to the radio-frequency module 1D according to the present embodiment, the switch 18 to which the reception paths 62 to 66 are connected is different from the switch 11 to which the transmission path 61 is connected. Specifically, the switch 18 is not connected to the transmission path and is connected only to the reception paths. Accordingly, since the switch 11 is not connected to the reception paths 62 to 66, the number of the selection terminals of the switch 11 is capable of being decreased. In addition, since the switch 18 is not connected to the transmission path 61, the number of the selection terminals of the switch 18 is capable of being decreased. Consequently, since the off capacitance of the switches 11 and 18 is capable of being reduced, the transmission loss of the transmission signal passing through the switch 11 is reduced and the transmission loss of the reception signals passing through the switch 18 is reduced.

In addition, since no high-power transmission path is connected to the switch 18, it is not necessary to increase the voltage resistance of the selection terminals of the switch 18. Accordingly, it is not necessary to ensure the long distance between the terminals of the switch 18. Accordingly, the switch 18 is reduced in size.

Furthermore, since the transmission path 61 is connected to the reception paths 62 to 66 via the two-stage switches 11 and 18 that are cascade-connected to each other, the transmission signal and the harmonic waves of the transmission signal transmitted on the transmission path 61 are inhibited from flowing into the reception paths 62 to 66. Accordingly, it is possible to suppress the degradation of the isolation between the transmission path and the reception paths.

Furthermore, when the reception signal in Band G is received and the transmission signal in Band A is not transmitted, it is possible to transmit the reception signal in Band G with low loss. When the transmission signal in Band A and the reception signal in Band G are concurrently transmitted and received, it is possible to suppress the degradation of the receiving sensitivity of the reception signal in Band G.

In the radio-frequency module 1D according to the present modification, no reception filter may be arranged on each of the reception paths 62 to 64 and 66. It is sufficient to arrange at least the reception paths 62, 63, and 65 as the reception paths connected to the switch 18.

Other Embodiments

Although the radio-frequency modules and the communication apparatuses according to the present disclosure are described above using the first and second embodiments and the modifications thereof, the radio-frequency modules and the communication apparatuses of the present disclosure are not limited to the above embodiments and the modifications thereof. Other embodiments realized by combining arbitrary components in the above embodiments and the modifications thereof, modifications realized by making various changes supposed by a person skilled in the art to the above embodiments and the modifications thereof without necessarily departing from the spirit and scope of the present disclosure, and various devices including the radio-frequency module and the communication apparatus of the present disclosure are also included in the present disclosure.

The radio-frequency modules and the communication apparatuses according to the first and second embodiments and the modifications thereof are applied to, for example, a communication system conforming to Third Generation Partnership Project (3GPP) standard or the like. Band A to Band J described in the first and second embodiments and the modifications thereof are applied to, for example, the respective bands in Long Term Evolution (LTE) or 5th Generation New Radio (5GNR).

For example, in the radio-frequency modules according to the first and second embodiments and the modifications thereof, any of Band 41 (frequency band: 2,496 MHz to 2,690 MHz), Band 40 (frequency band: 2,300 MHz to 2,400 MHz), Band (transmission band: 1,920 MHz to 1,980 MHz), Band 3 (transmission band: 1,710 MHz to 1,785 MHz), Band 5 (transmission band: 824 MHz to 849 MHz), Band 7 (transmission band: 2,500 MHz to 2,700 MHz), Band 8 (transmission band: 880 MHz to 915 MHz), Band 25 (transmission band: 1,850 MHz to 1,915 MHz), Band 26 (transmission band: 814 MHz to 849 MHz), Band 28 (transmission band: 703 MHz to 748 MHz), Band 34 (frequency band: 2,010 MHz to 2,025 MHz), Band 39 (frequency band: 1,880 MHz to 1,920 MHz), Band 66 (transmission band: 1,710 MHz to 1,780 MHz), and Band 74 (transmission band: 1,427 MHz to 1,470 MHz) of LTE and n40, n41, n1, n3, n5, n7, n8, n25, n26, n28, n34, n39, n66, and n74 of 5GNR may be applied as Band A (the first communication band).

Any of Band 1 (reception band: 2,110 MHz to 2,170 MHz), Band 3 (reception band: 1,805 MHz to 1,880 MHz), Band 5 (reception band: 869 MHz to 894 MHz), Band 8 (reception band: 925 MHz to 960 MHz), Band 11 (reception band: 1,475.9 MHz to 1,495.9 MHz), Band 25 (reception band: 1,930 MHz to 1,995 MHz), Band 26 (reception band: 859 MHz to 894 MHz), Band 28 (reception band: 758 MHz to 803 MHz), Band 34, Band 39, and Band 40, and n1, n3, n5, n7, n8, n11, n20, n25, n26, n28, n34, n38, n39, n40, n66, n78, and n79 of 5GNR may be applied as Band B to Band F (the second communication band and the third communication band), which are not used concurrently with the transmission of the transmission signal in Band A.

Any of Band 1, Band 3, Band 5, Band 8, Band 11, Band 21 (reception band: 1,495.9 MHz to 1,510.9 MHz), Band 25, Band 26, Band 28, Band 32 (reception band: 1,452 MHz to 1,496 MHz), Band 34, Band 39, Band 40, Band 66 (reception band: 2,110 MHz to 2,200 MHz), and Band 74 (reception band: 1,475 MHz to 1,518 MHz), and n1, n3, n5, n7, n8, n11, n20, n25, n26, n28, n34, n38, n39, n40, n66, n74, n78, and n79 of 5GNR may be applied as Band G (the fourth communication band), Band H, and Band J, which are used concurrently with the transmission of the transmission signal in Band A.

Although the configuration in which two different communication bands are capable of being concurrently used is exemplified in the above embodiments, the configurations of the radio-frequency modules and the communication apparatuses according to the present disclosure are also applicable to a configuration in which three or more different communication bands are capable of being concurrently used. In other words, the radio-frequency module or the communication apparatus having the configuration in which three or more different communication bands are capable of being concurrently used and including the configuration of the radio-frequency module or the communication apparatus according to any of the above embodiments and the modifications thereof is also included in the present disclosure.

For example, in the radio-frequency modules and the communication apparatuses according to the above embodiments and the modifications thereof, other radio-frequency circuit elements, lines, and so on may be provided between the paths connecting the respective circuit elements to the signal paths disclosed in the drawings.

In the radio-frequency modules and the communication apparatuses according to the above embodiments and the modifications thereof, "A is connected to B" includes not only an aspect in which A is directly connected to B not via another radio-frequency circuit element but also an aspect in which A is indirectly connected to B via a passive circuit composed of an inductor, a capacitor, and so on.

In the above embodiments, the transmission-reception terminal 110, the reception terminal 120 (the reception terminals 120B and 120C), and the transmission terminal 130 may not be arranged on the lines with which two elements are connected. In this case, for example, in the radio-frequency module 1, the transmission-reception terminal 110 corresponds to the common terminal 11a of the switch 11, the reception terminal 120B corresponds to the output terminal of the reception filter 32R or the input terminal of the reception amplifier 42R, the reception terminal 120C corresponds to the output terminal of the reception filter 33R or the input terminal of the reception amplifier 43R, and the transmission terminal 130 corresponds to the input terminal of the transmission filter 21T or the output terminal of the transmission amplifier 41T.

In the above embodiments, a "path connecting A to B" is defined as the path arranged between A and B, in the path passing through A and B. This path is, for example, a line and includes a circuit element arranged on the line.

INDUSTRIAL APPLICABILITY

The present disclosure is widely usable for a communication device, such as a mobile phone, as a multiband-multimode front-end module capable of concurrently transmitting radio-frequency signals in different communication bands.

REFERENCE SIGNS LIST 1, 1A, 1B, 1C, 1D, 1E radio-frequency module
2 antenna
4 radio-frequency signal processing circuit (RFIC)
5 baseband signal processing circuit (BBIC)
6 communication apparatus
11, 12, 13, 14, 15, 16, 17, 18, 19 switch
11a, 12a, 13a, 14a, 15a, 16a, 17a, 18a, 18g, 19a common terminal
11b, 11c, 12b, 12c, 13b, 13c, 13d, 13e, 14b, 14c, 14d, 15b, 15c, 15d, 15e, 15f, 16b, 16c, 16d, 17b, 17c, 18b, 18c, 18d, 18e, 18f, 19b, 19c, 19d, 19e selection terminal
21T transmission filter 25 filter
30 first filter group
32R, 33R, 34R, 35R, 36R, 51R, 52R, 53R reception filter
41T transmission amplifier
42R, 43R reception amplifier
50 second filter group
60, 62, 63, 64, 65, 66, 67, 68 reception path
61 transmission path
110 transmission-reception terminal
120, 120B, 120C reception terminal
130 transmission terminal

The invention claimed is:

1. A radio-frequency module comprising:
a transmission-reception terminal, a first reception terminal, a second reception terminal, and a transmission terminal;
a first transmission path having a first end connected to the transmission terminal;
a first reception path having a first end connected to the first reception terminal;
a second reception path having a first end connected to the second reception terminal;
a first switch that has a first common terminal, a first selection terminal, and a second selection terminal, and that is configured to selectively connect the first common terminal to the first selection terminal or to the second selection terminal; and
a second switch that has a second common terminal, a third selection terminal, and a fourth selection terminal, and that is configured to selectively connect the second common terminal to the third selection terminal or to the fourth selection terminal,
wherein the first common terminal is connected to the transmission-reception terminal,
wherein the first selection terminal is connected to the second common terminal,
wherein the second selection terminal is connected to a second end of the first transmission path,
wherein the third selection terminal is connected to a second end of the first reception path,
wherein the fourth selection terminal is connected to a second end of the second reception path,
wherein the second switch is connected to the first and second reception paths, and is not connected to the transmission path,
wherein a transmission signal in a first communication band input through the transmission terminal is transmitted on the first transmission path,
wherein a reception signal in a second communication band input through the transmission-reception terminal is transmitted on the first reception path,
wherein a reception signal in a third communication band input through the transmission-reception terminal is transmitted on the second reception path,
wherein the transmission of the reception signal in the second communication band on the first reception path and the transmission of the transmission signal in the first communication band on the first transmission path are exclusively performed, and
wherein the transmission of the reception signal in the third communication band on the second reception path and the transmission of the transmission signal in the first communication band on the first transmission path are exclusively performed.

2. The radio-frequency module according to claim 1, wherein the first switch further has a fifth selection terminal,
wherein the radio-frequency module further comprises a third reception path connected to the fifth selection terminal and on which a reception signal in a fourth communication band input through the transmission-reception terminal is transmitted, and
wherein the transmission of the transmission signal in the first communication band on the first transmission path is performed concurrently with the transmission of the reception signal in the fourth communication band on the third reception path.

3. The radio-frequency module according to claim 2, further comprising:
a third switch that is on the third reception path, that has a third common terminal, a sixth selection terminal connected to the fifth selection terminal, and a seventh selection terminal, and that is configured to selectively connect the third common terminal to the sixth selection terminal or to the seventh selection terminal;
a first reception filter that is on the third reception path, that has a passband comprising the fourth communication band, and that has an input terminal connected to the third common terminal; and
a second filter that has an input terminal connected to the second selection terminal, that has an output terminal connected to the seventh selection terminal, and that has an attenuation band comprising a transmission band of the first communication band,
wherein the third reception path includes a first bypass path connecting the fifth selection terminal to the sixth selection terminal and on which no filter is arranged.

4. The radio-frequency module according to claim 3,
wherein, when the transmission signal in the first communication band and the reception signal in the fourth communication band are concurrently transmitted, the third common terminal is connected to the seventh selection terminal and the third common terminal is not connected to the sixth selection terminal, and
wherein, when the reception signal in the fourth communication band is transmitted and the transmission signal in the first communication band is not transmitted, the third common terminal is connected to the sixth selection terminal and the third common terminal is not connected to the seventh selection terminal.

5. The radio-frequency module according to claim 3, wherein a frequency range of the first communication band is different than a frequency range of the fourth communication band.

6. The radio-frequency module according to claim 5, wherein the transmission band of the first communication band is higher in frequency than a reception band of the fourth communication band.

7. The radio-frequency module according to claim 2,
wherein the fourth communication band is any of Band 1, Band 3, Band 5, Band 8, Band 11, Band 21, Band 25, Band 26, Band 28, Band 32, Band 34, Band 39, Band 40, Band 66, or Band 74 of Long Term Evolution (LTE), or n1, n3, n5, n7, n8, n11, n20, n25, n26, n28, n34, n38, n39, n40, n66, and n74 of 5th Generation New radio (5GNR), and
wherein the first communication band is any of Band 1, Band 3, Band 5, Band 7, Band 8, Band 25, Band 26, Band 28, Band 34, Band 39, Band 40, Band 41, Band 66, or Band 74 of LTE, or n1, n3, n5, n7, n8, n25, n26, n28, n34, n39, n40, n41, n66, n78, n79, and n74 of 5GNR.

8. The radio-frequency module according to claim 1, wherein the first transmission path supports High Power User Equipment (HPUE).

9. A communication apparatus comprising:
the radio-frequency module according to claim 1; and
a radio-frequency signal processing circuit that is configured to process radio-frequency signals transmitted and received in the radio-frequency module.

10. A radio-frequency module comprising:
a transmission-reception terminal, a first reception terminal, a second reception terminal, and a transmission terminal;
a first transmission path having a first end connected to the transmission terminal;
a first reception path having a first end connected to the first reception terminal;
a second reception path having a first end connected to the second reception terminal;
a first switch that has a first common terminal, a first selection terminal, and a second selection terminal, and that is configured to selectively connect the first common terminal to the first selection terminal or to the second selection terminal; and
a second switch that has a second common terminal, a third selection terminal, and a fourth selection terminal, and that is configured to selectively connect the second common terminal to the third selection terminal or to the fourth selection terminal,
wherein the first common terminal is connected to the transmission-reception terminal,
wherein the first selection terminal is connected to the second common terminal,
wherein the second selection terminal is connected to a second end of the first transmission path,
wherein the third selection terminal is connected to a second end of the first reception path,
wherein the fourth selection terminal is connected to a second end of the second reception path,
wherein the second switch is connected to the first and second reception paths, and is not connected to the transmission path,
wherein a transmission signal in a first communication band input through the transmission terminal is transmitted on the first transmission path,
wherein a reception signal in a second communication band input through the transmission-reception terminal is transmitted on the first reception path,
wherein a reception signal in a third communication band input through the transmission-reception terminal is transmitted on the second reception path,
wherein the second switch further has a fourth common terminal and an eighth selection terminal,
wherein the radio-frequency module further comprises:
a third reception path connected to the eighth selection terminal and on which a reception signal in the fourth communication band input through the transmission-reception terminal is transmitted; and
a second filter that has an input terminal connected to the second selection terminal, that has an output terminal connected to the fourth common terminal, and that has an attenuation band comprising a transmission band of the first communication band,
wherein a path connecting the first selection terminal to the second common terminal is a first bypass path on which no filter is arranged, and
wherein the transmission of the transmission signal in the first communication band on the first transmission path is performed concurrently with the transmission of the reception signal in the fourth communication band on the third reception path.

11. The radio-frequency module according to 6,
wherein, when the transmission signal in the first communication band and the reception signal in the fourth communication band are concurrently transmitted, the fourth common terminal is connected to the eighth selection terminal and the second common terminal is not connected to eighth selection terminal, and
wherein, when the reception signal in the fourth communication band is transmitted and the transmission signal in the first communication band is not transmitted, the second common terminal is connected to the eighth selection terminal and the fourth common terminal is not connected to the eighth selection terminal.

12. The radio-frequency module according to claim 10, wherein a frequency range of the first communication band is different than a frequency range of the fourth communication band.

13. The radio-frequency module according to claim 12, wherein the transmission band of the first communication band is higher in frequency than a reception band of the fourth communication band.

14. The radio-frequency module according to claim 10,
wherein the fourth communication band is any of Band 1, Band 3, Band 5, Band 8, Band 11, Band 21, Band 25, Band 26, Band 28, Band 32, Band 34, Band 39, Band 40, Band 66, or Band 74 of Long Term Evolution (LTE), or n1, n3, n5, n7, n8, n11, n20, n25, n26, n28, n34, n38, n39, n40, n66, and n74 of 5th Generation New radio (5GNR), and
wherein the first communication band is any of Band 1, Band 3, Band 5, Band 7, Band 8, Band 25, Band 26, Band 28, Band 34, Band 39, Band 40, Band 41, Band 66, or Band 74 of LTE, or n1, n3, n5, n7, n8, n25, n26, n28, n34, n39, n40, n41, n66, n78, n79, and n74 of 5GNR.

15. The radio-frequency module according to claim 10, wherein the first transmission path supports High Power User Equipment (HPUE).

16. A communication apparatus comprising:
the radio-frequency module according to claim 15; and
a radio-frequency signal processing circuit that is configured to process radio-frequency signals transmitted and received in the radio-frequency module.

* * * * *